(12) United States Patent
Kanoda et al.

(10) Patent No.: US 12,292,504 B2
(45) Date of Patent: May 6, 2025

(54) DISPLACEMENT SENSOR

(71) Applicant: Keyence Corporation, Osaka (JP)

(72) Inventors: Sohei Kanoda, Osaka (JP); Shinichiro Otsu, Osaka (JP); Choryon Oh, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 1094 days.

(21) Appl. No.: 17/195,689

(22) Filed: Mar. 9, 2021

(65) Prior Publication Data

US 2021/0318437 A1    Oct. 14, 2021

(30) Foreign Application Priority Data

Apr. 10, 2020    (JP) .................. 2020-071363

(51) Int. Cl.
| | | |
|---|---|---|
| *G01S 17/42* | (2006.01) | |
| *G01C 3/08* | (2006.01) | |
| *G01S 7/48* | (2006.01) | |
| *G01S 7/481* | (2006.01) | |

(52) U.S. Cl.
CPC .............. *G01S 17/42* (2013.01); *G01C 3/08* (2013.01); *G01S 7/4808* (2013.01); *G01S 7/481* (2013.01); *G01S 7/4813* (2013.01)

(58) Field of Classification Search
CPC .......... G01S 17/42; G01S 17/48; G01S 17/08; G01C 3/08
See application file for complete search history.

(56) References Cited

U.S. PATENT DOCUMENTS

| | | | | |
|---|---|---|---|---|
| 6,151,106 A | * | 11/2000 | Ohtomo | G01S 7/4817 356/141.4 |
| 6,642,510 B1 | * | 11/2003 | Sugiyama | G01V 8/12 250/221 |
| 6,646,251 B1 | | 11/2003 | Okamoto | |
| 6,774,357 B2 | | 8/2004 | Sugiyama et al. | |

(Continued)

FOREIGN PATENT DOCUMENTS

| | | |
|---|---|---|
| JP | S50-59987 U | 6/1975 |
| JP | 2004004562 A * | 1/2004 |

(Continued)

OTHER PUBLICATIONS

U.S. Appl. No. 17/195,690, filed Mar. 9, 2021 (81 pages).

(Continued)

*Primary Examiner* — Isam A Alsomiri
*Assistant Examiner* — Joseph C Fritchman
(74) *Attorney, Agent, or Firm* — Kilyk & Bowersox, P.L.L.C.

(57) ABSTRACT

Provided is a displacement sensor having a modular structure that allows further downsizing. A housing of a head is made up of a main housing and a lid member, both of which are precision molded products made of a metal material. A first holder to which a light projector is bonded and a second holder to which a light receiver is bonded are individually positioned on and bonded to the lid member. This work is performed by a mounting device. Optical components such as a light projecting lens are also bonded to the lid member, and the lid member modularized by incorporating such optical components is assembled and welded to the main housing.

20 Claims, 19 Drawing Sheets

(56) References Cited

U.S. PATENT DOCUMENTS

| | | | |
|---|---|---|---|
| 7,022,979 | B2 | 4/2006 | Sugiyama et al. |
| 7,098,441 | B2 | 8/2006 | Yamaguchi et al. |
| 7,176,451 | B2 | 2/2007 | Sugiyama et al. |
| 7,244,917 | B2 | 7/2007 | Tsukigi et al. |
| 7,312,854 | B2 | 12/2007 | Sugiyama et al. |
| 7,417,217 | B2 | 8/2008 | Deguchi et al. |
| 7,427,748 | B2 | 9/2008 | Deguchi et al. |
| 7,639,373 | B2 | 12/2009 | Torii et al. |
| 7,639,374 | B2 | 12/2009 | Torii et al. |
| 7,787,131 | B1 * | 8/2010 | Moran ............... G01B 9/02098 356/520 |
| 7,961,992 | B2 * | 6/2011 | De Dobbelaere .... G02B 6/4214 361/767 |
| 9,141,025 | B1 * | 9/2015 | Tomioka ............... G02B 26/121 |
| 9,841,808 | B2 | 12/2017 | Hanada |
| 9,933,306 | B2 | 4/2018 | Tsukigi et al. |
| 10,348,051 | B1 * | 7/2019 | Shah ....................... G01S 17/34 |
| 2003/0179387 | A1 * | 9/2003 | Uno ..................... G01B 11/026 356/624 |
| 2010/0127159 | A1 | 5/2010 | Watanabe |
| 2014/0327902 | A1 * | 11/2014 | Giger ..................... G01S 17/08 356/5.01 |
| 2015/0108376 | A1 * | 4/2015 | Kawaguchi .............. G02B 7/08 250/559.38 |
| 2019/0383917 | A1 * | 12/2019 | Shinozuka ............ G01S 7/4915 |
| 2020/0025880 | A1 * | 1/2020 | Pacala ................... G01S 7/4813 |
| 2021/0293957 | A1 * | 9/2021 | Kubota ................. G01S 7/4814 |

FOREIGN PATENT DOCUMENTS

| | | | | |
|---|---|---|---|---|
| JP | 2008145160 | A | 6/2008 | |
| JP | 2010127635 | A | 6/2010 | |
| JP | 2013127943 | A | 6/2013 | |
| JP | 2013251247 | A | 12/2013 | |
| WO | WO-2012042933 | A1 * | 4/2012 | ............... G02B 7/02 |

OTHER PUBLICATIONS

Office Action issued in corresponding Japanese Patent Application No. 2020-071363 dated Feb. 28, 2024 (with English translation) (10 pages).

Office Action issued in corresponding Japanese Patent Application No. 2020-071363 issued Nov. 29, 2023 (with English translation) (10 pages).

* cited by examiner

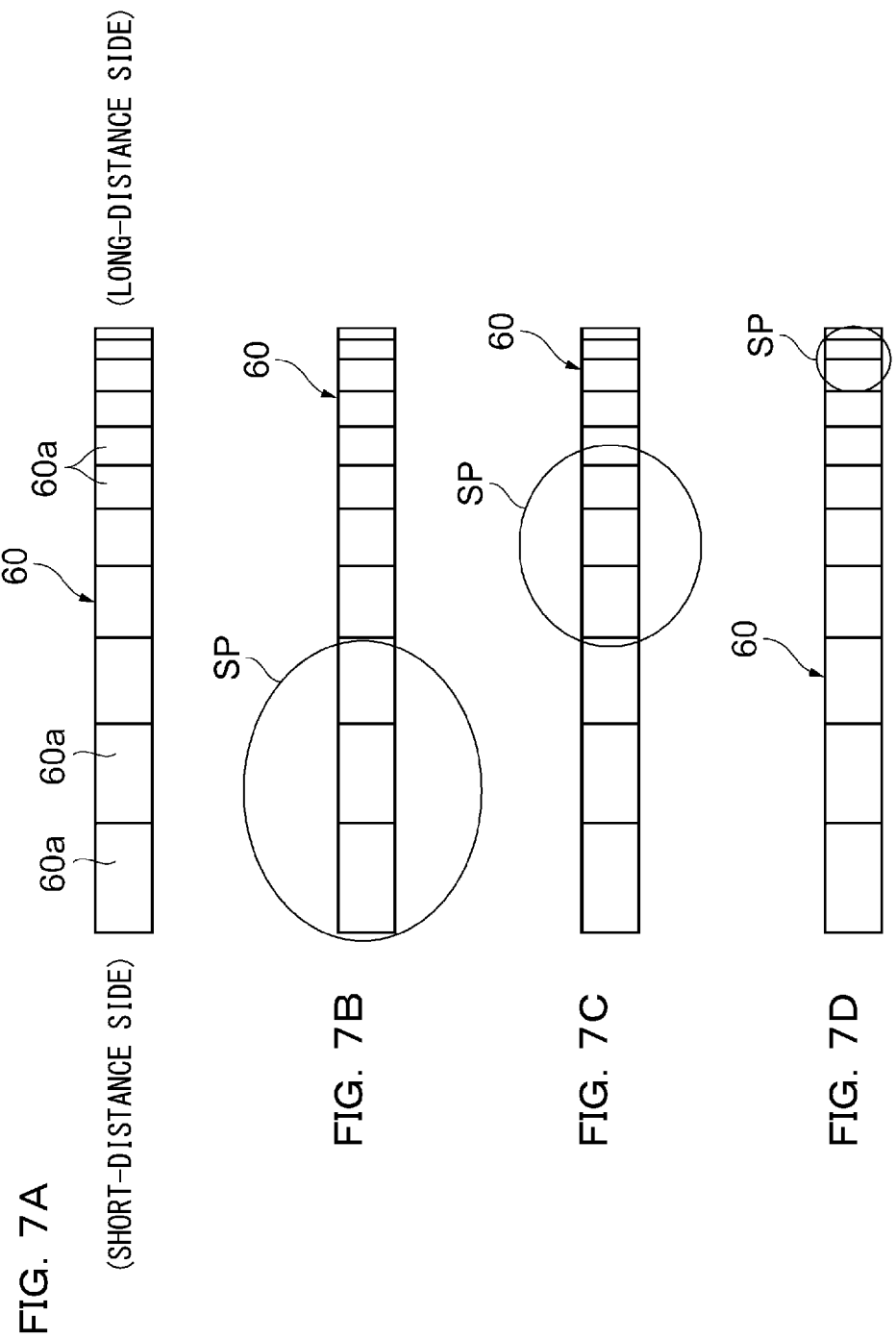

DISPLACEMENT SENSOR

CROSS-REFERENCE TO RELATED APPLICATIONS

The present application claims foreign priority based on Japanese Patent Application No. 2020-071363, filed Apr. 10, 2020, the contents of which are incorporated herein by reference.

BACKGROUND OF THE INVENTION

1. Field of the Invention

The present invention relates to a displacement sensor that detects displacement and outputs an ON/OFF determination signal, and more particularly to a displacement sensor provided with a metal housing.

2. Description of Related Art

There are two types of displacement sensors, one including an image sensor that performs photoelectric conversion and the other including no image sensor, and such displacement sensors are used selectively according to various applications. Specific examples of the displacement sensors include a proximity switch, a contact switch, an ultrasonic switch, a triangulation sensor, a time of flight (TOF), a photoelectric switch, and the like. Such displacement sensors are applicable to the measurement of the height of a to-be-detected object, the measurement of the unevenness of the surface of the to-be-detected object, the detection of the presence or absence of the to-be-detected object, and the like.

JP 2013-127943 A discloses a displacement sensor provided with a metal housing. The displacement sensor includes a light projecting element and an imaging element. The light projecting element projects detection light toward a detection region through a light projecting lens, and the imaging element receives light reflected off the detection region through a light receiving lens.

The displacement sensor disclosed in JP 2013-127943 A is made up of an optical system module housed in the metal housing. The optical system module includes a resin molded frame, and the light projecting element, the light projecting lens, the light receiving lens, and the imaging element are assembled to the resin molded frame. Further, the resin molded frame is assembled to the metal housing with a heat dissipating rubber interposed between the resin molded frame and the metal housing.

Heat generated by the light projecting element and the like is dissipated to the metal housing through the heat dissipating rubber that is in contact with the resin molded frame.

SUMMARY OF THE INVENTION

The inventor of the present application has come up with the present invention by paying attention to the above-described resin molded frame during development for the purpose of further downsizing.

It is therefore an object of the present invention to provide a displacement sensor having a modular structure that allows further downsizing.

According to one embodiment of the invention, provided is a displacement sensor including a light projecting element that projects light, a metal housing including a transmission window that transmits light, a first holder member that holds the light projecting element and is bonded to an optical base serving as a part of the metal housing, a light projecting lens that is fixed to the optical base, condenses the light projected from the light projecting element for forming a light projected spot, and causes the light to impinge on a detection region through the transmission window, a light receiving lens that is fixed to the optical base and condenses light from the detection region to form an image of the light projected spot in the detection region, an imaging element that captures the image of the light projected spot in the detection region formed by the light receiving lens and generates a light receiving signal in accordance with intensity of received light, a second holder member that holds the imaging element and is bonded to the optical base, and a measuring part that identifies a position of the light projected spot in the imaging element on the basis of the light receiving signal from the imaging element and measures displacement of a to-be-detected object on the basis of the position of the light projected spot identified, in which the light projecting element and the light receiving element are insulated from the optical base by a ceramic material, the first and second holder members are individually bonded and fixed to the optical base, and the optical base serving as the part of the metal housing is modularized by incorporating an optical component.

An electrical insulating material provided between the first and second holder members and the optical base preferably has heat conductivity.

The actions and effects and other objects of the present invention will become apparent from the detailed description of the preferred embodiment given below.

BRIEF DESCRIPTION OF THE DRAWINGS

FIG. 6B shows a position where the image of the spot is formed when the workpiece is located at a short distance;

FIG. 6C shows a position where the image of the spot is formed when the workpiece is located at an intermediate position;

FIG. 6D shows a position where the image of the spot is formed when the workpiece is located at a long distance;

FIGS. 7A to 7D are diagrams for describing settings of a pixel width of image pixels arranged at unequal intervals;

FIG. 7B shows a pixel width corresponding to a size of the spot when the workpiece is located at a short distance;

FIG. 7C shows a pixel width corresponding to a size of the spot when the workpiece is located at an intermediate position;

FIG. 7D shows a pixel width corresponding to a size of the spot when the workpiece is located at a long distance;

FIG. 17A shows a state where the first and second holder members are bonded to the lid member with an adhesive evenly applied;

DETAILED DESCRIPTION OF PREFERRED EMBODIMENTS

Embodiments

Figure 1:
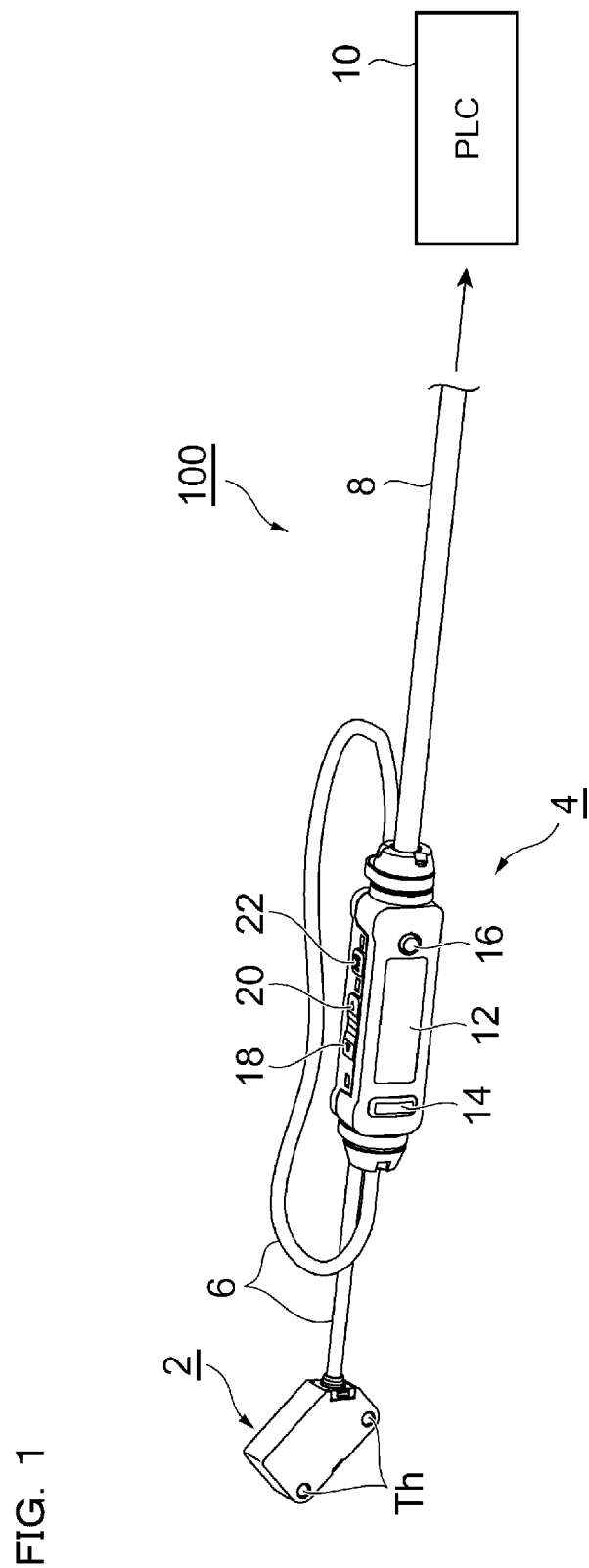
FIG. 1 is a diagram for describing an optical triangulation sensor according to an embodiment.

A description will be given below of a preferred embodiment of the present invention with reference to the accompanying drawings. FIG. 1 shows a displacement sensor according to the embodiment, and more specifically, an optical triangulation sensor 100. The triangulation sensor 100 is made up of a head 2 and a body 4 that are separate, and the head 2 and the body 4 are connected by a relay cable 6. The relay cable 6 is preferably soldered to the head 2 and the body 4 without a connector.

Among components included in a typical triangulation sensor, a group of bare-bones components such as an optical component necessary for triangulation, and an element and power supply board for such an optical component are housed in the head 2, and other user interface members, specifically, a group of components such as a dot matrix display serving as a display such as an organic EL display (OELD: Organic Electro-Luminescence Display), and an operation part made up of an operation button are provided in the body 4. This allows the head 2 to be downsized.

Specifically, the head 2 is made up of bare-bones components primarily responsible for projecting and receiving light to and from a to-be-detected object, while the body 4 is made up of a power supply circuit, a display, and an operation part. The head 2 includes a green laser light source and emits the green laser light to form a spot on the to-be-detected object.

In the triangulation sensor 100 according to the embodiment, the head 2 having no display function is made up of only the bare-bones components necessary for projecting and receiving light to and from the to-be-detected object, thereby allowing the head 2 to be downsized.

This in turn increases a degree of freedom in determining a location where the head 2 is installed. Further, the body 4 integrated with the head 2 by the relay cable 6 also has a degree of freedom in determining an installation location of the body 4. Thus, placing the head 2 at a position suitable for the measurement of the to-be-detected object and placing the body 4 at any desired position near the head 2 allows setting work such as a setting of a determination threshold to be performed while visually recognizing the spot of the green laser light appearing on the surface of the to-be-detected object to determine whether the position of the spot is appropriate and viewing a screen on an OELD 12.

Figure 2:
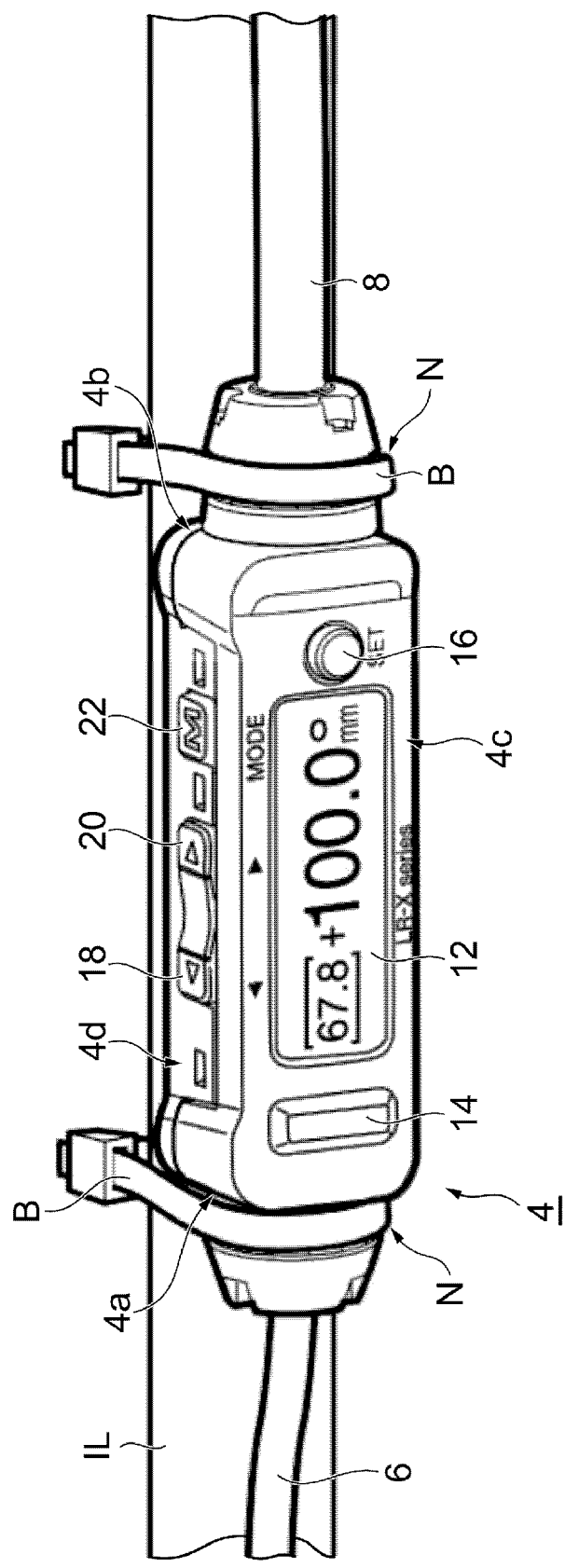
FIG. 2 is a diagram for describing that a body serving as a part of the optical triangulation sensor according to the embodiment is allowed to be fixed at a desired position.

FIG. 2 shows the body 4. The body 4 has a long and narrow outer shape with a somewhat flat and approximate rectangular cross section, and includes a head side end 4a located at one end in its longitudinal direction and an output side end 4b located at the other end in the longitudinal direction. Further, four side surfaces of the body 4 include a first side surface 4c that is relatively wide and a second side surface 4d that is narrow and adjacent to the first side surface 4c.

An output cable 8 is connected to the body 4, and a determination signal, that is, an ON/OFF signal, is output from the body 4 through the output cable 8 to a controller 10 (FIG. 1) such as a PLC (Programmable Logic Controller) or a separated amplifier separated from a sensor head of a conventional separated type sensor. Both the relay cable 6 and the output cable 8 have flexibility that allows the relay cable 6 and the output cable 8 to be bent, and a distance between the head 2 and the body 4 can be adjusted as desired by folding and bundling the relay cable 6 as shown in FIG. 1. With reference to FIG. 2, the body 4 has a groove-shaped neck N extending in the longitudinal direction from both the head side end 4a and the output side end 4b, the groove-shaped neck N having a groove extending in a circumferential direction, and a peripheral surface of the neck N preferably forms a circular shape. Binding the neck N with a zip tie B allows the body 4 to be fixed to a desired installation location IL near the head 2, for example, a location about 30 cm away from the head 2.

As a modification to the position where the neck N is disposed, instead of the neck N, a groove for receiving the zip tie B may be provided near the head side end 4a and output side end 4b of the body 4. The OELD 12 is disposed on the wide first side surface 4c. Further, a body operation indicator lamp 14 and a SET button 16 are arranged on one end of the first side surface 4c and on the other end of the first side surface 4c, respectively, such that the OELD 12 is interposed between the body operation indicator lamp 14 and the SET button 16. The SET button 16 is used to select an operation mode such as automatic threshold setting (teaching mode). An UP button 18 and a DOWN button 20 are arranged adjacent to each other on the narrow second side surface 4d, and a mode button 22 is further disposed on the narrow second side surface 4d. The UP and DOWN buttons 18, 20 are used, for example, to adjust a threshold or select a menu. The mode button 22 is used to switch the operation modes of the triangulation sensor 100. The SET button 16 described above may be disposed on the narrow second side surface 4d rather than the first side surface 4c.

Figure 3:
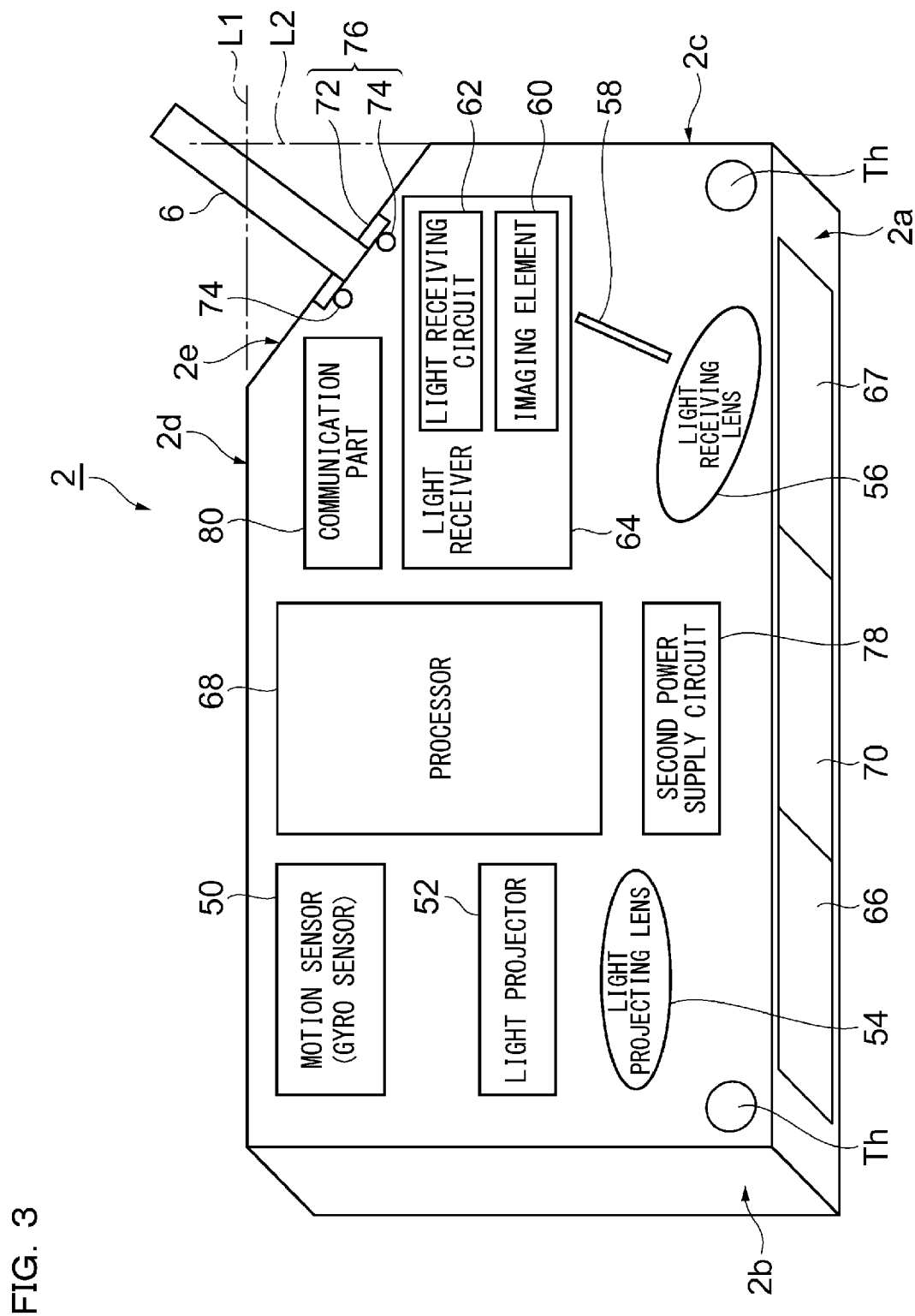
FIG. 3 is a diagram for describing components built in a head serving as a part of the optical triangulation sensor according to the embodiment.

FIG. 3 is a diagram for describing components arranged inside the head 2. The head 2 includes a motion sensor 50 that detects a change in installation position of the head 2. A typical example of the motion sensor 50 is a gyro sensor, and other examples include an acceleration sensor and a geomagnetic sensor. The motion sensor 50 is installed integrally with the head 2. Specifically, the motion sensor 50 is assembled to the head 2 so as not to be displaced relative to the head 2. This allows the motion sensor 50 to sensitively detect optical axis displacement caused by a change in installation position of the head 2 to which an external force is applied, and in turn makes it possible to issue an optical axis displacement alarm.

The head 2 includes a light projector 52, a light projecting lens 54, a light receiving lens 56, a mirror 58, and an imaging element 60, and these components form an optical path for triangulation. The light projecting lens 54 is made up of a collimator lens. As a modification, the light projecting lens 54 may be made up of a combination of a collimator lens and a cylindrical lens. The imaging element 60 is made up of a linear image sensor, and the imaging element 60 includes a charge storage element. A light receiver 64 is made up of the imaging element 60 and a light receiving circuit 62. As will be described later, it is preferable that, in the imaging element 60, the shorter the distance, the larger the width of each pixel 60a, and the longer the distance, the smaller the width of each pixel 60a.

The cylindrical lenses have a property of generating a band-shaped light beam in the width direction.

Generating a band-shaped projection light beam in the width direction with the combination of the collimator lens and the cylindrical lens and aligning the band-shaped light beam with each pixel 60a of the light receiving element 60 having a rectangular shape allows the light receiving element 60 to substantially receive almost all reflected light of detection light. Therefore, the use of the combination of the collimator lens and the cylindrical lens can increase the measurement accuracy.

The light projector 52 is preferably made up of a semiconductor laser light source (gallium nitride (InGaN/GaN) laser light source) that emits green laser light. The head 2 projects, toward the detection region to be detected, the green laser light that is the detection light. A state of an irradiated spot on the workpiece affects the detection accuracy. The smaller the spot where light is condensed, the higher the detection accuracy. The green laser light is excellent in spot state as compared to red laser light. As will be described later, green is excellent in relative luminosity. The use of such a characteristic makes it possible to ensure the visibility of the spot even when a limit is put on intensity and power of the green laser light.

Needless to say, it is desirable for the user to be able to visually confirm that a desired position on the workpiece is irradiated with the projection light beam in order to properly perform the detection.

The green laser light emitted by the light projector 52 reaches the workpiece through the light projecting lens 54 and a light projecting window 66. The reflected light reflected off the surface of the workpiece passes through a light receiving window 67 and the light receiving lens 56, is refracted by the mirror 58, and is received by the light receiver 64. That is, the light receiver 64 receives the green laser light reflected off the detection region on the workpiece and photoelectrically converts the green laser light into a light receiving signal. The light projector 52 and the light receiver 64 are controlled by a processor 68 built in the head 2.

As can be seen from FIG. 3, the head 2 has an approximate cuboid shape that is relatively thin, and the light projecting window 66 and the light receiving window 67 are arranged on a narrow light projecting and receiving surface 2a (FIG. 3). Between the light projecting window 66 and the light receiving window 67, for example, a front operation indicator lamp 70 made up of a two-color LED (Light Emitting Diode) including red and green LEDs is disposed. The front operation indicator lamp 70 can light up or blink in red, green, or yellow that is a mixture of red and green.

Of first and second ends 2b, 2c of the head 2 in the longitudinal direction, a corner 2e between the second end 2c away from the light projecting window 66 and a back surface 2d opposite from the light projecting and receiving surface 2a has a chamfered shape, and the corner 2e is preferably an inclined surface of 45°. A hole through which the relay cable 6 passes is formed at the corner 2e, and a water blocking member 72 prevents water from entering the hole. A two-color LED 74 that is the same in color as the front operation indicator lamp 70 is disposed inside the head 2 directly adjacent to the water blocking member 72. The water blocking member 72 is made of a light guide member that transmits light, and an output part operation indicator lamp 76 is made up of the LED 74 and the light guide water blocking member 72. The front operation indicator lamp 70 and the output part operation indicator lamp 76 are caused to light up in yellow or green in synchronization with the ON/OFF determination signal or are caused to blink, for example, in red to indicate an error.

For the installation of the head 2, the light projecting and receiving surface 2a where the light projecting and receiving windows 66, 67 are located and the corner 2e where the relay cable 6 is located are usually placed in an exposed state. For actual operation, arranging the front operation indicator lamp 70 and the output part operation indicator lamp 76 on the light projecting and receiving surface 2a and the corner 2e placed in the exposed state eliminates the need for the front operation indicator lamp 70 and the output part operation indicator lamp 76 to protrude from the outer contour of the head 2. In other words, the user can recognize the front operation indicator lamp 70 and/or the output part operation indicator lamp 76 lighting up or blinking without the need for the front operation indicator lamp 70 and the output part operation indicator lamp 76 to protrude, which prevents the outer contour of the head 2 from being smaller.

As described above, the relay cable 6 is connected to the corner 2e that is preferably an inclined surface of 45°. Further, the light guide water blocking member 72 serves as a part of the output part operation indicator lamp 76. Therefore, a second indicator lamp 76 disposed at the corner 2e is located inside respective extension lines L1, L2 of the back surface 2d and the second end 2c that define the outer contour of the head 2 (FIG. 3). In other words, the second indicator lamp 76 does not protrude outward beyond the extension lines L1, L2. As a result, the external dimensions of the head 2 that has been downsized due to the presence of the output part operation indicator lamp 76 are not increased. The front operation indicator lamp 70 and the output part operation indicator lamp 76 may protrude from the outer contour of the head 2 when the head 2 is not intended to be downsized.

As described above with reference to FIG. 2, binding the groove-shaped neck N of the body 4 with the zip tie B allows the body 4 to be fixed to the desired location IL near the head 2. The body 4 has a rectangular cross section. The first side surface on which the OELD 12 is installed and the narrow second side surface on which the UP/DOWN buttons 18, 20, etc. are installed meet at right angles. A third side surface opposite from the first side surface and a fourth side surface opposite from the second side surface are flat surfaces and serve as installation surfaces. With the third side surface and/or the fourth side surface in contact with the installation location, the body 4 can be fixed, with the zip tie B, to the desired location (for example, a pillar) that is relatively flat and near the head 2.

Figure 4:
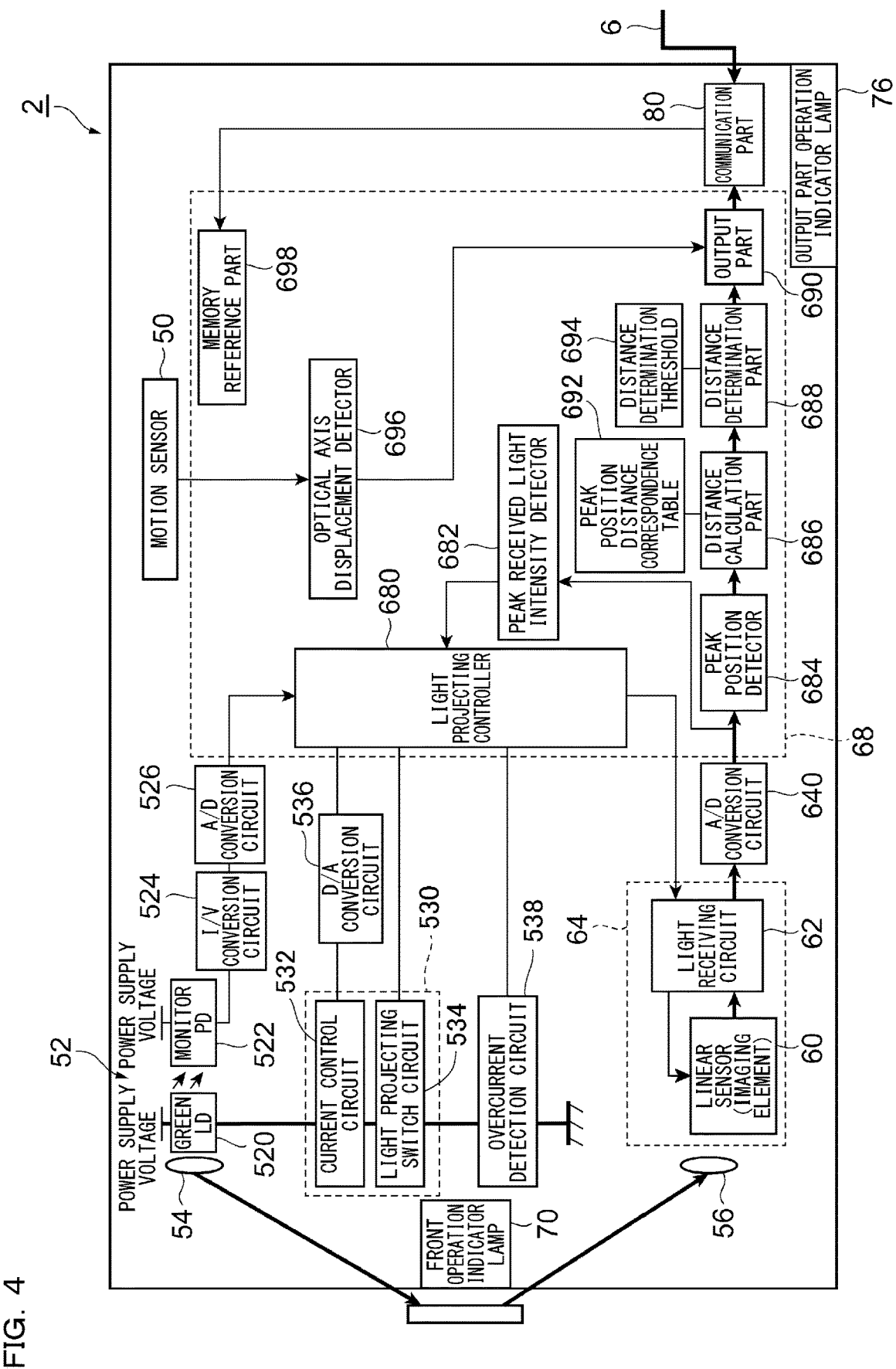
FIG. 4 is a block diagram for describing an internal structure of the head.

FIG. 4 is a block diagram for describing a control system of the head 2. Laser light emitted by a green laser diode (LD) 520 serving as the light projector 52 is monitored by a photodiode (monitor PD) 522, and an output current from the monitor PD 522 is input to a light projecting controller 680 via an I/V conversion circuit 524 and an A/D conversion circuit 526. The green LD 520 is controlled by an LD drive circuit 530, and the LD drive circuit 530 is controlled by the light projecting controller 680. The LD drive circuit 530 includes a current control circuit 532 and a light projecting switch circuit 534. A control signal is input from the light projecting controller 680 to the current control circuit 532 via a D/A conversion circuit 536, and a control signal is input from the light projecting controller 680 to the light projecting switch circuit 534. This causes the green LD 520 to project laser light at predetermined intervals and with predetermined intensity. When an overcurrent flows through the LD drive circuit 530, the overcurrent is detected by an overcurrent detection circuit 538, and information on the detection made by the overcurrent detection circuit 538 is supplied to the light projecting controller 680. This causes a light projecting control circuit 680 to perform control to suppress overcurrent.

Information on received light of the light receiving circuit 62 serving as the light receiver 64 is input to a microcomputer 68 via an A/D conversion circuit 640. It makes up the microcomputer 68, a peak received light intensity detector 682, a peak position detector 684, a distance calculation part 686, a distance determination part 688, and an output part 690. The peak received light intensity detector 682 detects a peak value of the received light intensity, and this peak value is input to the light projecting controller 680 to be reflected in the light projecting control. The peak position of the received light intensity is detected by the peak position detector 684 from the information on the received light intensity detected by the light receiver 64, and a detection distance to the workpiece is measured by the distance calculation part 686 on the basis of this peak position. For this distance measurement, a table 692 showing a correspondence between the peak position and the distance is referenced. The detection distance thus calculated is determined by the distance determination part 688 through comparison with a determination threshold 694 read from a memory in which the determination threshold 694 is stored. The measurement information (containing the determination threshold) containing data on this determination and information on the received light necessary for a display on the OELD 12 to be described later is supplied to the body 4 through the output part 690 and a communication part 80. Further, on the basis of the determination result made by the distance determination part 688, the front operation indicator lamp 70 and output part operation indicator lamp 76 of the head light up/blink. This allows the user to know the current measurement status in real time.

The head 2 includes the motion sensor 50, and the motion sensor 50 is integrated with the head 2. The detection signal of the gyro sensor serving as the motion sensor 50 is input to an optical axis displacement detector 696. The optical axis displacement detector 696 reads a threshold from a memory reference part 698, and supplies optical axis displacement occurrence information to the output part 690 when an optical axis displacement occurrence detection signal is equal to or greater than the threshold. This optical axis displacement occurrence information is supplied to the body 4 through the communication part 80.

Figure 5A:
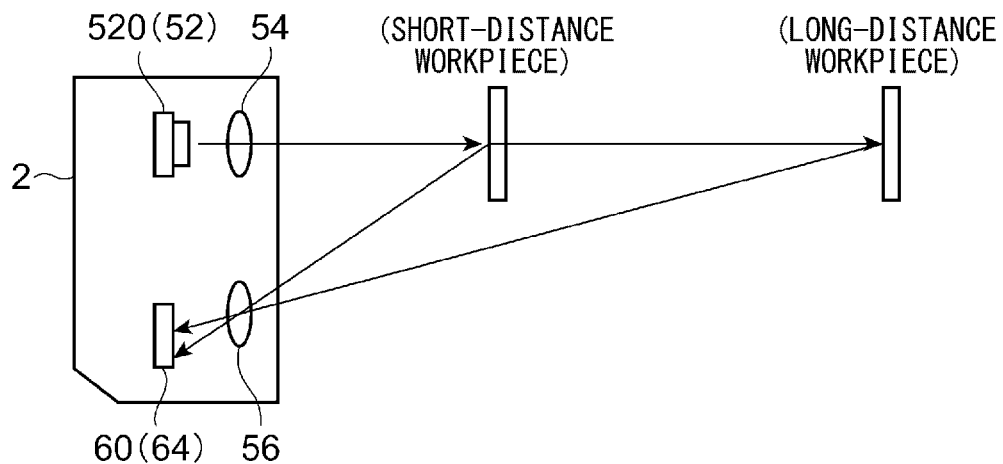
FIG. 5A is a diagram for describing that a position of an image of a spot in an imaging element changes in a manner that depends on a distance to a position of a workpiece.
Figure 5B:
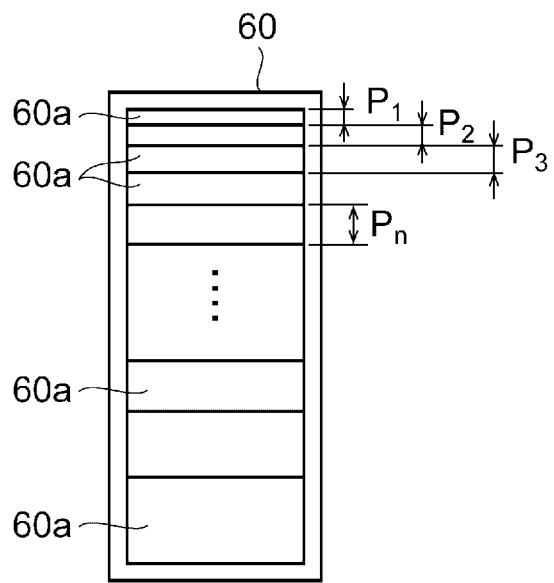
FIG. 5B is a diagram for describing an image of image pixels arranged at unequal intervals.

The width of each pixel 60a of the imaging element 60 described above will be described with reference to FIGS. 5A to 5B, 6A to 6D and 7A to 7D. FIG. 5A is a diagram for describing that, for example, in the imaging element 60 made of a CMOS, a portion that receives the reflected light differs in a manner that depends on a distance to the workpiece. In the illustrated example, when the workpiece is located at a short distance, the image of the spot is formed in a lower portion of the imaging element 60 (FIG. 5B). Further, as will be described next, the image of the spot is relatively large. On the other hand, when the workpiece is located at a long distance, the image of the spot is formed in an upper portion of the imaging element 60. Further, the image of the spot is relatively small. As will be described later, the imaging element 60 is designed such that the group of pixels 60a of the imaging element 60 preferably has a width Pn that becomes larger from the portion that receives light when the workpiece is located at a long distance toward the portion that receives light when the workpiece is located at a short distance. Herein, the width Pn of the pixels 60a substantially means a distance between two adjacent pixels 60a, that is, between the center of the first pixel and the center of the second pixel.

Figure 6A:
FIGS. 6A to 6D are diagrams for describing an explanation in image pixels arranged at equal intervals.
Figure 6B:
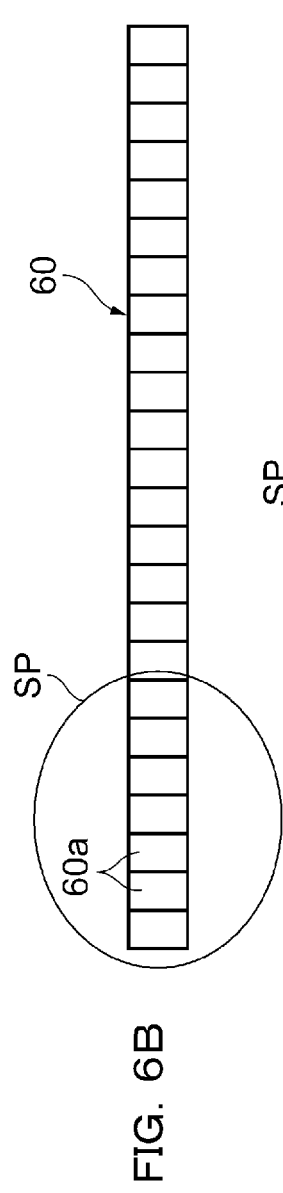
Figure 6C:
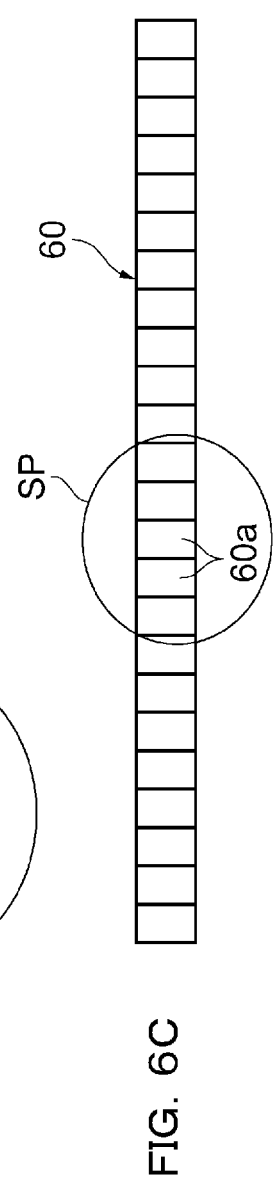
Figure 6D:
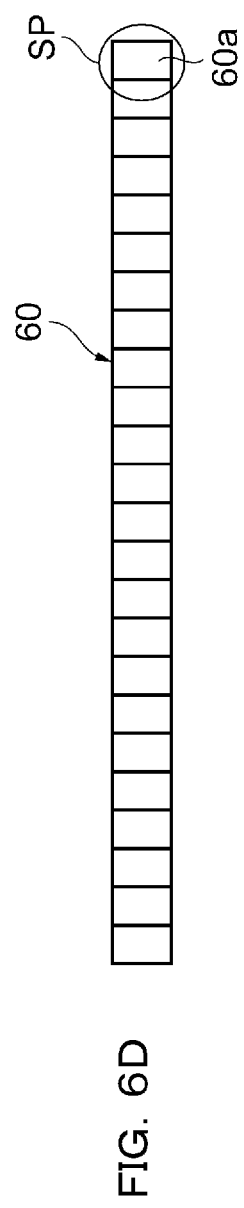

FIG. 6A is a diagram for describing that, in the rectangular imaging element 60 made up of the plurality of pixels 60a, a portion that receives a spot image SP differs and the size of the spot image SP varies in a manner that depends on a distance to the workpiece. FIG. 6B shows that a spot is formed at one end of the group of pixels 60a of the imaging element 60 in an alignment direction when the workpiece is located at a short distance. FIG. 6C shows that a spot is formed at an intermediate portion of the group of pixels 60a of the imaging element 60 when the workpiece is located at an intermediate position. FIG. 6D shows that a spot is formed at the other end of the group of pixels 60 of the imaging element 60 in the alignment direction when the workpiece is located at a long distance.

As can be seen from FIG. 6B, the spot image SP becomes larger when the workpiece is located at a short distance, and the spot image SP becomes smaller when the workpiece is located at a long distance (FIG. 6D). In a case where the pixels 60a of the imaging element 60 are arranged at equal intervals, in the illustrated example, when the workpiece is located at a short distance, the light is received by seven pixels 60a. On the other hand, when the workpiece is located at a long distance, the light is received by one pixel 60a.

When the workpiece is located at a short distance, and light representing the spot image SP is received by a plurality of pixels 60a (FIG. 6B), the number of pixels 60a that receive the light is large, and a received light waveform can approximate to a curve on the basis of data on light received by the plurality of pixels 60a, thereby increasing the accuracy of estimating the peak position of the received light intensity. On the other hand, when the workpiece is located at a long distance, and light representing the spot image SP is received by, for example, one pixel 60*a* (FIG. 6D), the peak position of the received light intensity cannot be estimated because the received light waveform cannot approximate to a curve. It is desirable that the width of each of light receiving pixels 60 be smaller in order to cause the received light waveform to approximate to a curve even when the workpiece is located at a long distance. On the other hand, when the width of each of the light receiving pixels 60 is made smaller, the number of pixels of the entire imaging element increases, and a processing load increases accordingly.

To solve this problem, it is preferable that the rectangular imaging element 60 mounted on the head 2 be designed such that the width of the pixel 60*a* varies in a manner that depends on a distance to the workpiece. FIG. 7 is a conceptual diagram for describing an example where the imaging element 60 is designed such that the width of the pixel 60*a* gradually decreases from the short distance side toward the long distance side. FIG. 7A is an image diagram of the imaging element 60 having pixels 60*a* arranged at unequal intervals. The size of the spot image SP formed by the imaging element 60 is determined in accordance with a detection range of the head 2. FIG. 7B shows a spot image formation position and the spot image SP when the workpiece is located at a short distance. FIG. 7C shows a spot image formation position and the spot image SP when the workpiece is located at an intermediate distance. FIG. 7D shows a spot image formation position and the spot image SP when the workpiece is located at a long distance. In the illustrated example, the width of the pixel 60*a* is defined such that the spot image SP is received by three pixels 60*a* regardless of the distance to the workpiece. This allows the peak position to be estimated by causing the received light intensity of the three pixels 60*a* that has received the spot image SP to approximate to a curve regardless of the distance to the workpiece. In addition, the number of pixels of the entire imaging element can be reduced, and the processing load can be reduced because many of the pixels 60*a* do not receive light. This makes it possible to achieve both peak position detection accuracy and a reduction in processing load. In the illustrated example, the spot image SP is received by the three pixels 60*a*. This is based on a reason that it is better to receive the spot image SP with at least three pixels 60*a* in order to cause the received light waveform to approximate to a curve.

Although the spot image SP is represented by a circle or an oval in FIGS. 7B to 7D, the shape of the spot image SP is not limited to the circle or the oval, and may be a rectangle.

Figure 8:
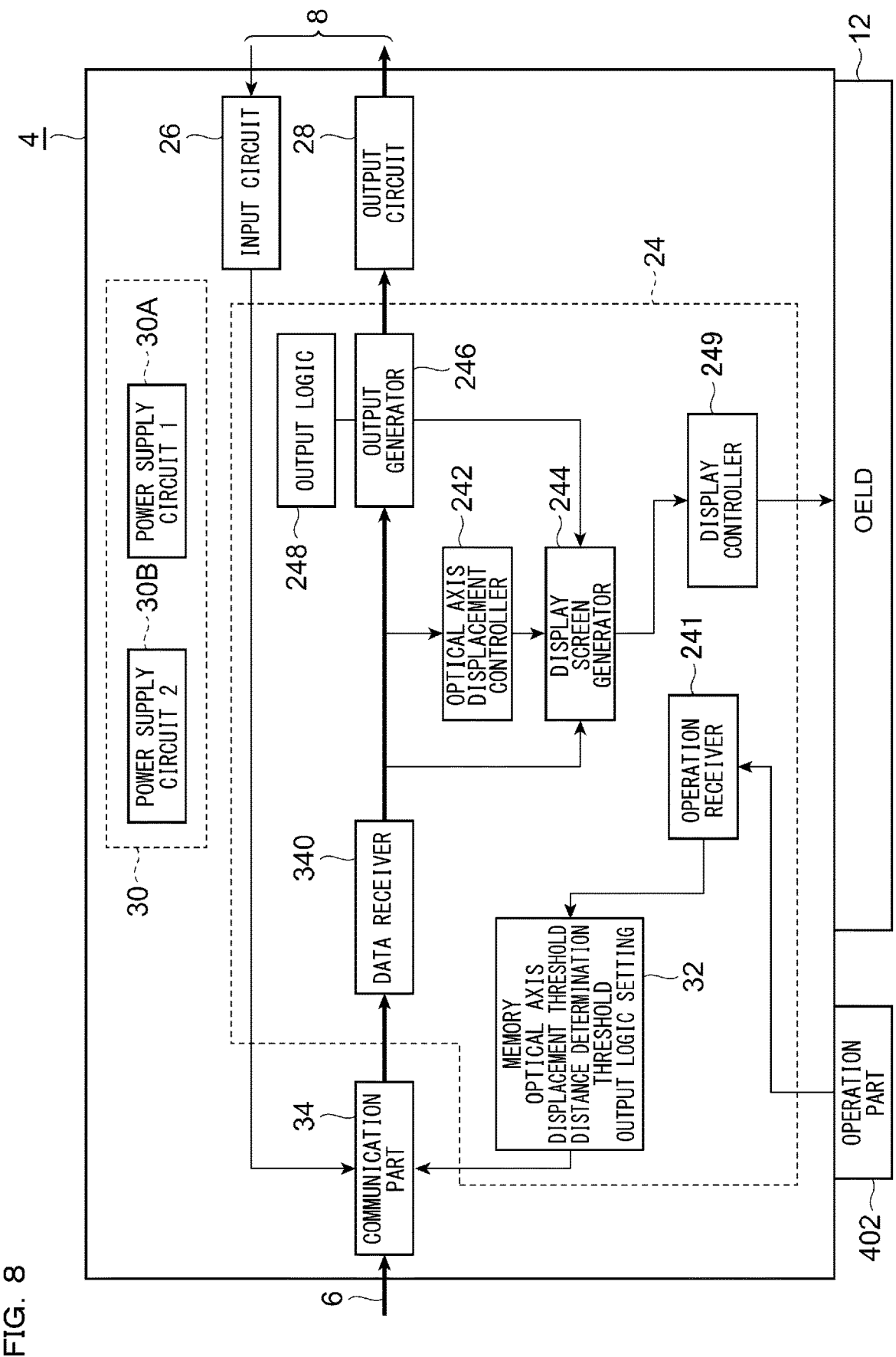
FIG. 8 is a block diagram for describing an internal structure of the body.

FIG. 8 is a block diagram for describing a control system of the body 4. The body 4 includes a processor 24, an input circuit 26, an output circuit 28, a power supply circuit 30, a memory 32, and a communication part 34. An operation part 402 shown in FIG. 8 corresponds to the SET button 16, the UP button 18, the DOWN button 20, and the mode button 22. The user can perform, by operating the operation part 402, a tuning setting, mask setting, threshold setting of the gyro sensor (motion sensor 50), output logic setting of the body 4, clear input, and the like. When the user operates the operation part 402, this operation is received by an operation receiver 241, and when the user performs an operation of changing, for example, the optical axis displacement threshold or the distance determination threshold, the optical axis displacement threshold or the distance determination threshold stored in the memory 32 is updated.

The measurement information containing the received light information and the optical axis displacement detection signal received from the head 2 through a data receiver 340 are supplied to an output generator 246. The output generator 246 generates output information containing a logic ON/OFF determination signal in accordance with an output logic 248 that can be set by the user, on the basis of the determination information contained in the received light information received from the head 2. This output information is supplied to an external device through the output circuit 28 and the output cable 8. Further, upon receipt of the optical axis displacement detection signal, the output generator 246 may output an alarm signal to the outside through the output circuit 28.

The output information described above may be generated by the body 4 as described above or by the head 2. Typically, the presence of the relay cable 6 that connects the head 2 and the body 4 makes it susceptible to noise. When the determination ON/OFF signal is generated by the head 2, the determination ON/OFF signal supplied to the body 4 through the relay cable 6 is a binary signal and is thus less susceptible to noise. On the other hand, when the determination ON/OFF signal is generated by the body 4, the head need not generate this determination ON/OFF signal, so that it is possible to avoid the circuit board of the head 2 from becoming complicated and to downsize the head 2 when the head 2 is intended to be downsized.

Further, the optical axis displacement detection signal received from the head 2 is supplied to an optical axis displacement controller 242. Upon receipt of the optical axis displacement detection signal, the optical axis displacement controller 242 supplies the optical axis displacement detection signal to a display screen generator 244. Upon receipt of the optical axis displacement detection signal, the display screen generator 244 immediately generates a display screen to be displayed on the OELD 12. The display screen generated by the display screen generator 244 is supplied to a display controller 249, and the display controller 249 controls rendering of an alarm notification display on the OELD 12 on the basis of the display screen generated by the display screen generator 244.

The measurement information containing the received light information containing the determination threshold received from the head 2 is received by the display screen generator 244. The display screen generator 244 generates the display screen to be displayed on the OELD 12 on the basis of the received light information. The display screen generated by the display screen generator 244 is supplied to the display controller 249, and the display controller 249 controls rendering of the current value display on the OELD 12 on the basis of the display screen generated by the display screen generator 244.

The head 2 has mounting through-holes Th on one end side and the other end side, in the longitudinal direction, of a portion adjacent to the light projecting and receiving surface 2*a*, and the mounting through-holes Th extend in a direction passing through the head 2, that is, a direction orthogonal to an optical axis of projection light. The head 2 is fixed to the installation location with bolts inserted into two mounting through-holes Th. That is, of the portion of the head 2 adjacent to the light projecting surface 2*a*, the mounting through-holes Th are each formed in a corresponding portion adjacent to a top surface 2*b* or portion adjacent to a bottom surface 2*c*, and the mounting through-holes Th extend through between both flat side surfaces of the head 2. Then, the head 2 is designed to be fixed to the installation location with bolts inserted through the mounting through-holes Th. Therefore, the pair of flat side surfaces extending parallel to each other and opposite from each other each serve as a mounting surface. The mounting through-holes Th extend in a direction orthogonal to the optical axis of the projection light beam. In other words, since both side surfaces serve as the mounting surfaces, it is convenient to adjust the direction of the optical axis in the optical axis adjustment for the installation of the head 2.

Further, the light projector 52 and the light receiver 64 are arranged between the two mounting through-holes Th, and a front indicator lamp 78 and a power supply circuit 78 are arranged between the light projector 52 and the light receiver 64. That is, heavy objects included in the head 2 are arranged between the two mounting through-holes Th. This facilitates the optical axis adjustment of the head 2. Further, the head 2 has an approximate cuboid shape, and a user interface function called the front indicator lamp 78 is provided only on the light projecting and receiving surface 2a that is one surface of the head 2. Not only the other surfaces except the corner 2e where the relay cable 6 is located, that is, both the flat side surfaces serving as the mounting surfaces, but also both the end surfaces 2b, 2c in the longitudinal direction, and the back surface 2d can be made flat, and the back surface 2d and both the end surfaces 2b, 2c in the longitudinal direction can be used as mounting surfaces. This makes it possible to increase the degree of freedom in selecting the installation location and installation position of the head 2.

Regarding the green laser light emitted by the head 2, the intensity and power of the green laser light emitted by the light projector 52 (green laser diode (LD) 520) is limited to a level that does not affect the user even when the user check the position of the spot of the green laser light with the naked eye. This limit is put by the microcomputer 68 on the basis of the intensity of light received by the monitor PD.

The limit is put on the intensity and power of the green laser light by the user in accordance with "Class 1" or "Class 2" of the safety standard for safe use of lasers (e.g. IEC, ANSI). Green has a wavelength of 500 nm to 555 nm, and is excellent in relative luminosity (bright relative luminosity and dark relative luminosity) as compared to the other colors. Therefore, the visibility of the spot can be ensured even when the intensity and power of the green laser light is limited to the above level.

Two operation modes may be prepared for the green LD 520, and the first mode in which the green LD 520 operates in Class 1 and the second mode in which the green LD 520 operates in Class 2 may be selectively used in accordance with a user's setting. It is preferable that the first mode can be selected, for example, for optical axis adjustment and/or inspection, and the second mode can be selected for teaching or operation.

Figure 9:
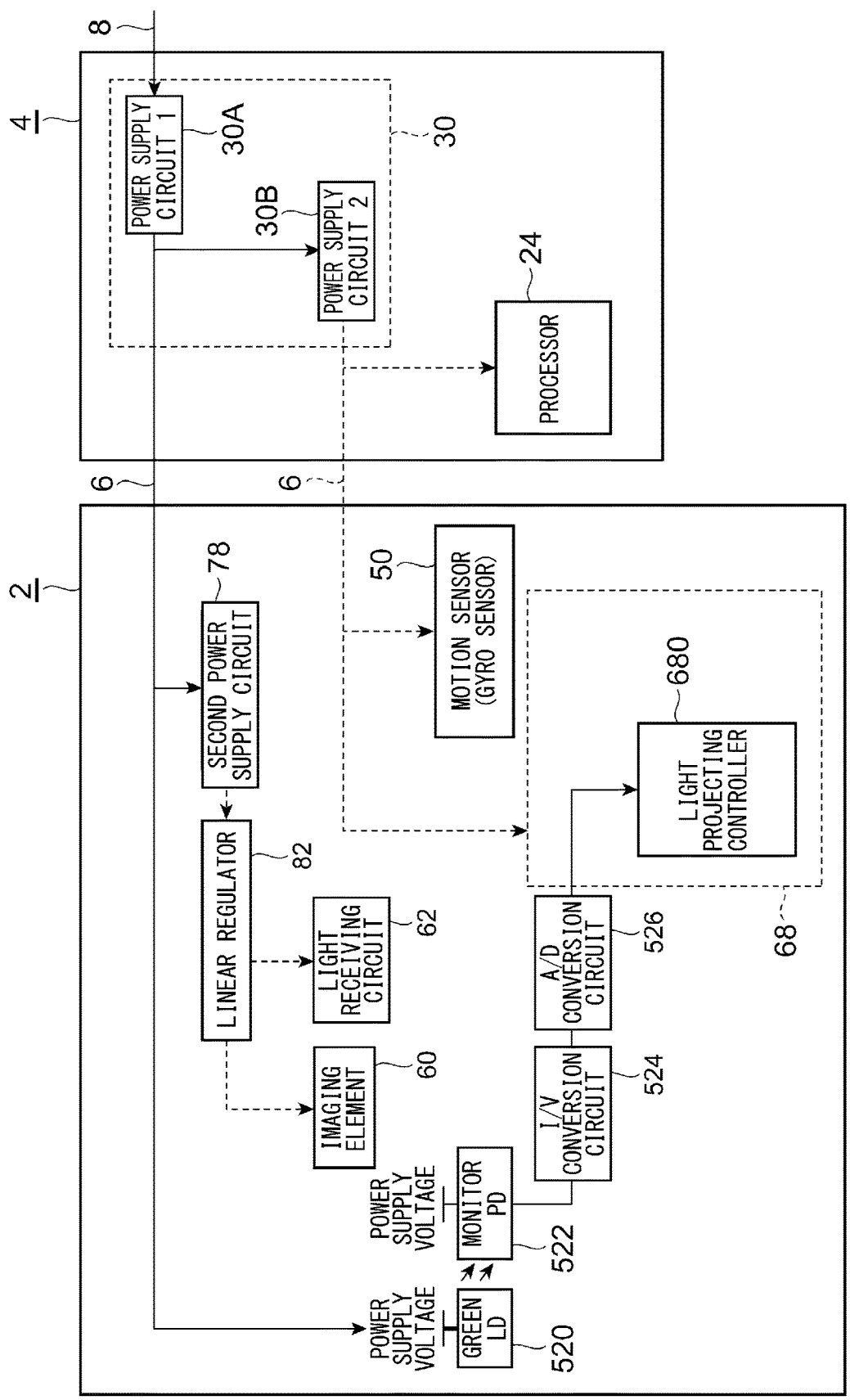
FIG. 9 is a diagram for describing power supply circuits included in the head and body.

FIG. 9 is a diagram for describing the power supply circuits included in the head 2 and the body 4. The body 4 has the power supply circuit 30 built therein. The power supply circuit 30 includes two power supply circuits 30A, 30B. One power supply circuit 30A regulates a voltage received from the outside and supplies the voltage to the other power supply circuit 30B and the head 2. The other power supply circuit 30B regulates the voltage and supplies the voltage to the processor 24 and the head 2, and the motion sensor (gyro sensor) 50 and processor 68 of the head 2 are driven by this voltage. The voltage of the one power supply circuit 30A of the body 4 is supplied to the green LD 520 and is also supplied to a second power supply circuit 78.

The second power supply circuit 78 regulates the voltage, and this voltage is stabilized by a linear regulator 82 and then supplied to the imaging element 60 and the light receiving circuit 62.

Figure 10:
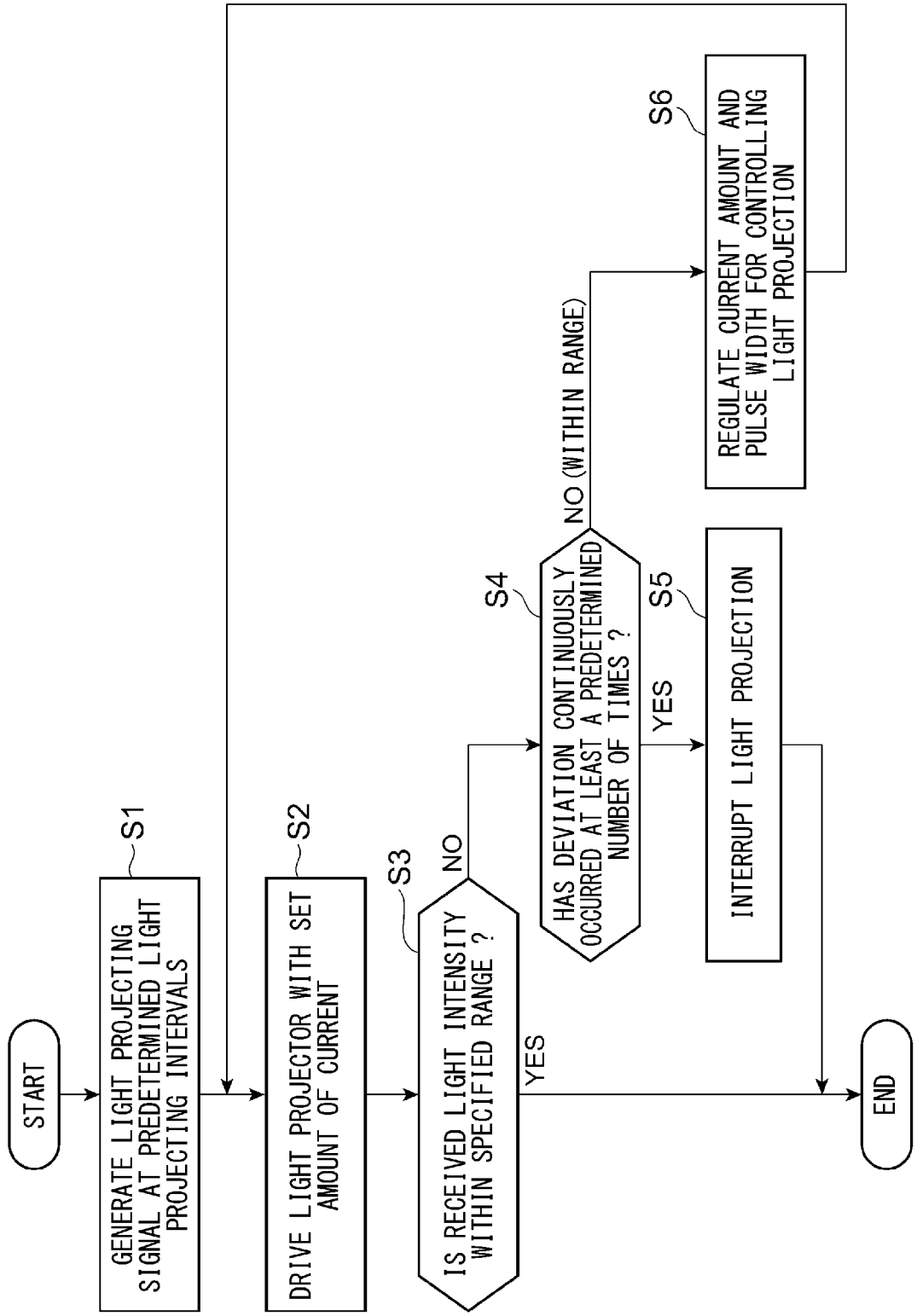
FIG. 10 is a flowchart for describing control on a limit on intensity and power of green laser light emitted from the head.

FIG. 10 is a flowchart for describing the control on the limit on the intensity and power of the LD 520 (FIG. 4) that emits the green laser light. With reference to FIG. 10, a light projecting signal is generated in step S1. This light projecting signal has predetermined light projecting intervals. In the next step S2, the green LD 520 is driven with a preset amount of current and pulse width. In the next step S3, a determination is made as to whether the intensity of received light received by the light receiver 64 falls within a range specified in advance, and when it is determined to be YES, the process returns to step S1. In step S3, when it is determined to be NO, that is, the intensity of received light falls out of the specified range, the process proceeds to step S4 to determine whether this deviation has continuously occurred at least a predetermined number of times. When it is determined to be YES in this step S4, that is, when the deviation has continuously occurred at least the predetermined number of times, it is considered that some failure has occurred and the power supply to the green LD 520 is interrupted (S5). When it is determined to be NO in step S4, the process proceeds to step S6 to regulate the amount of current and pulse width for controlling the green LD 520, and the process returns to step S2.

Steps S3 to S6 described above substantially serve as a limiter that puts a limit on the intensity and power of the green laser light. The intensity and power of the green laser light emitted by the light projector 52 is limited to a level that does not affect the user even when the user checks, with the naked eye, the position of the spot of the green laser light that impinges on the workpiece. This limit may be set in accordance with the safety standard "Class 1" or "Class 2". Green has a wavelength of 500 nm to 555 nm, and is excellent in relative luminosity (bright relative luminosity and dark relative luminosity) as compared to the other colors. Therefore, even when the intensity and power of the green laser light is limited to the above level, the visibility of the spot with the naked eye can be ensured.

Figure 11:
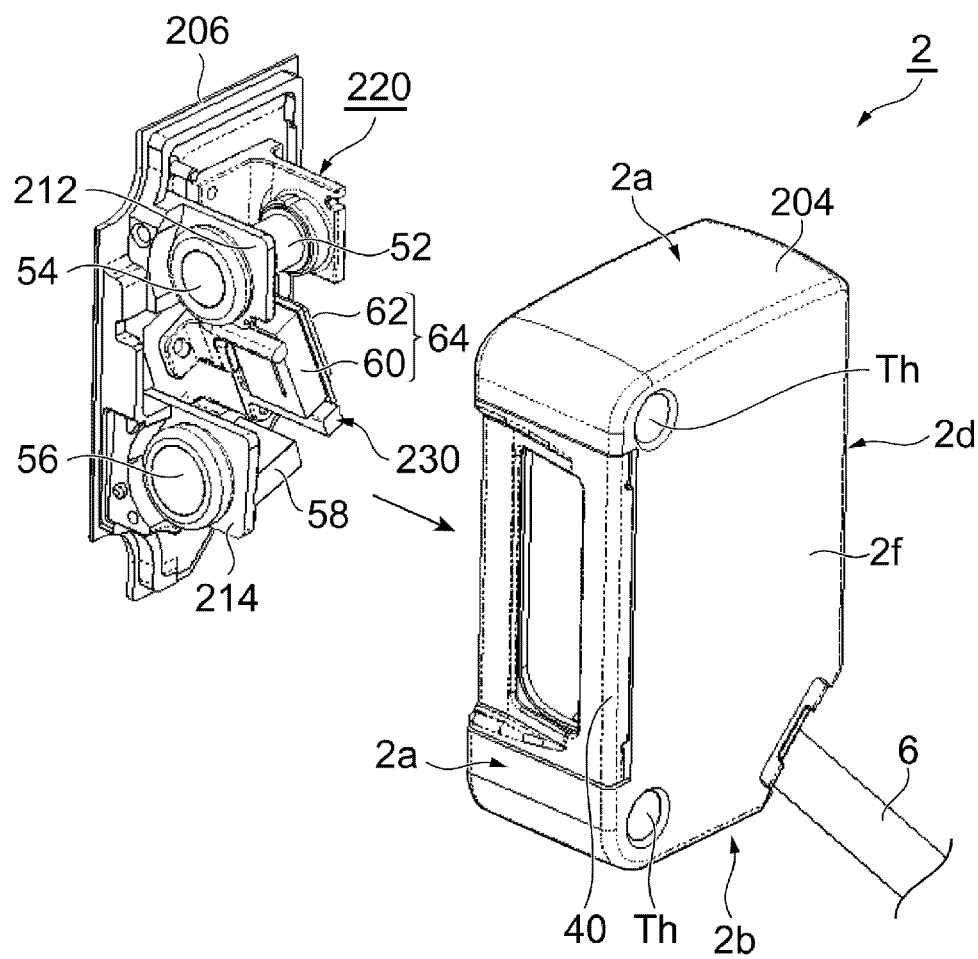
FIG. 11 is an exploded perspective view of the head.
Figure 12:
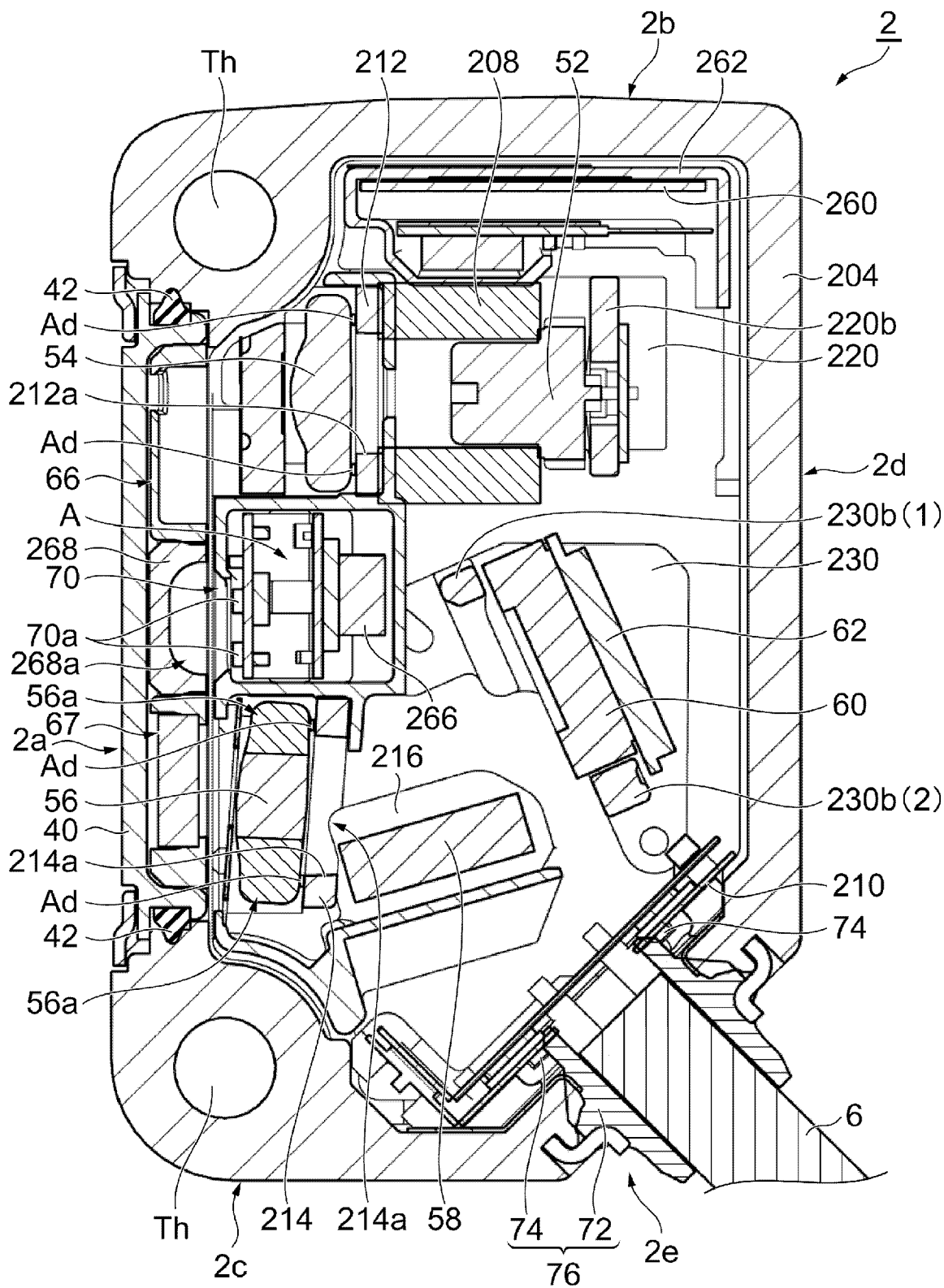
FIG. 12 is a vertical cross-sectional view of the head corresponding to FIG. 11.

FIG. 11 is an exploded perspective view of the head 2. FIG. 11 is a diagram for describing optical system components and a holder for the components; therefore, no illustration will be given of the other components and elements. A housing 202 of the head 2 is made up of a main housing 204 and a lid member 206, and both the main housing 204 and the lid member 206 are precision molded products made of a metal material. A typical example of the metal material is stainless steel. FIG. 12 is a vertical cross-sectional view of the head 2 corresponding to FIG. 11.

One of the two side surfaces of the main housing 204 is formed by the lid member 206. That is, the main housing 204 has a box shape having a side opposite from a flat side surface denoted by a reference numeral 2f in FIG. 11, that is, a mounting surface, opened, and the lid member 206 is fixed to the main housing 204 by welding to airtightly cover the opening. The lid member 206 serves as the other flat side surface, that is, a mounting surface, of the main housing 204 opposite from the side surface 2f.

The lid member 206 serves as an optical base or frame on which the optical system components are mounted, and the lid member 206 itself is modularized with the optical system components mounted on the lid member 206. Then, the modularized lid member 206 including the optical system components is assembled to the main housing 204, and then the lid member 206 is welded to the main housing 204 to construct the head 2.

In FIG. 11, a reference numeral 40 denotes a metal holding member. The light projecting and receiving surface 2a of the head 2 is substantially formed by the metal holding member 40, and a seal member 42 is compressed by the metal holding member 40. The seal member 42 ensures the watertightness of the light projecting and receiving surface 2a of the head 2.

In FIG. 12, a signal lamp unit A serving as a front operation signal lamp 70 includes an LED board on which a two-color LED 70a is mounted. As can be seen with reference to FIG. 12, it is shown that the signal lamp unit A is disposed in a dead space between the light projecting lens 54 and the light receiving lens 56. This disposition allows the head 2 to be downsized. Disposing the output part operation indicator lamp 76 at the corner 2 also has the effect of downsizing the head 2, but vertically disposing an LED board 210 on which the two-color LED 74 serving as the output part operation indicator lamp 76 are mounted with respect to the side surface of the head 2 also has the effect of downsizing the head 2.

A reference numeral 208 in FIG. 12 denotes a lens barrel made of a flexible light-shielding or light-absorbing material such as a black-colored sponge. The flexible lens barrel 208 is installed between the light projector 52 and the light projecting window 66 after the optical system components such as the light projector 52, the light projecting lens 54, and the light receiving lens 56 are mounted on the lid member 206. FIG. 12 is a diagram showing only the optical system components. In reality, it should be understood that it is in a dense state due to the board and the like. With reference to FIG. 12, since the light projector 52 is located at the upper corner and the output part operation indicator lamp 76 at the corner 2e is located at the lower position and far apart from the light projector 52, it is less likely that stray light of the light emitted by the light projector 52 will reach the mirror 58, the imaging element 60, or a light guide waterproof gasket 96. This likelihood can be eliminated by installing the flexible lens barrel 208 between the light projector 52 and the light projecting window 66.

As described above, the lid member 206 is a precision molded product made of metal. With reference to FIGS. 11 and 12, on the back surface of the lid member 206, three holders 212, 214, 216 are integrally molded, in an upright position, at locations where the light projecting lens 54 and the light receiving lens 56 are disposed. The first and second holders 212, 214 have openings 212a, 214a, respectively, allowing light to passing through. The light projecting lens 54 is fixed to the first holder 212 with an adhesive Ad (FIG. 12). The light receiving lens 56 is fixed to the second holder 214 with the adhesive Ad. The mirror 58 is fixed to the third holder 216 (FIG. 12) by adhesion.

Since the mirror 58 has a cuboid shape, the third holder 216 has a shape substantially serving as a base of the mirror 58, and the mirror 58 is bonded onto the third holder 216. As a modification, the third holder 216 may be omitted. Further, a structure may be employed where, instead of the third holder 216, a base member made of a molded product is prepared, and the base member is bonded to both the mirror 58 and the lid member 206.

The first to third holders 212, 214, 216 allow the light projecting lens 54, the light receiving lens 56, and the mirror 58 to be directly fixed to the lid member 206 with the adhesive Ad, respectively. As a modification, a structure may be employed where all or some of the first to third holders 212, 214, 216 are made of a holder member separate from the lid member 206, and the light projecting lens 54, the light receiving lens 56, and the mirror 58 are bonded to such a holder member, and the holder member is bonded to the lid member 206.

Figure 13:
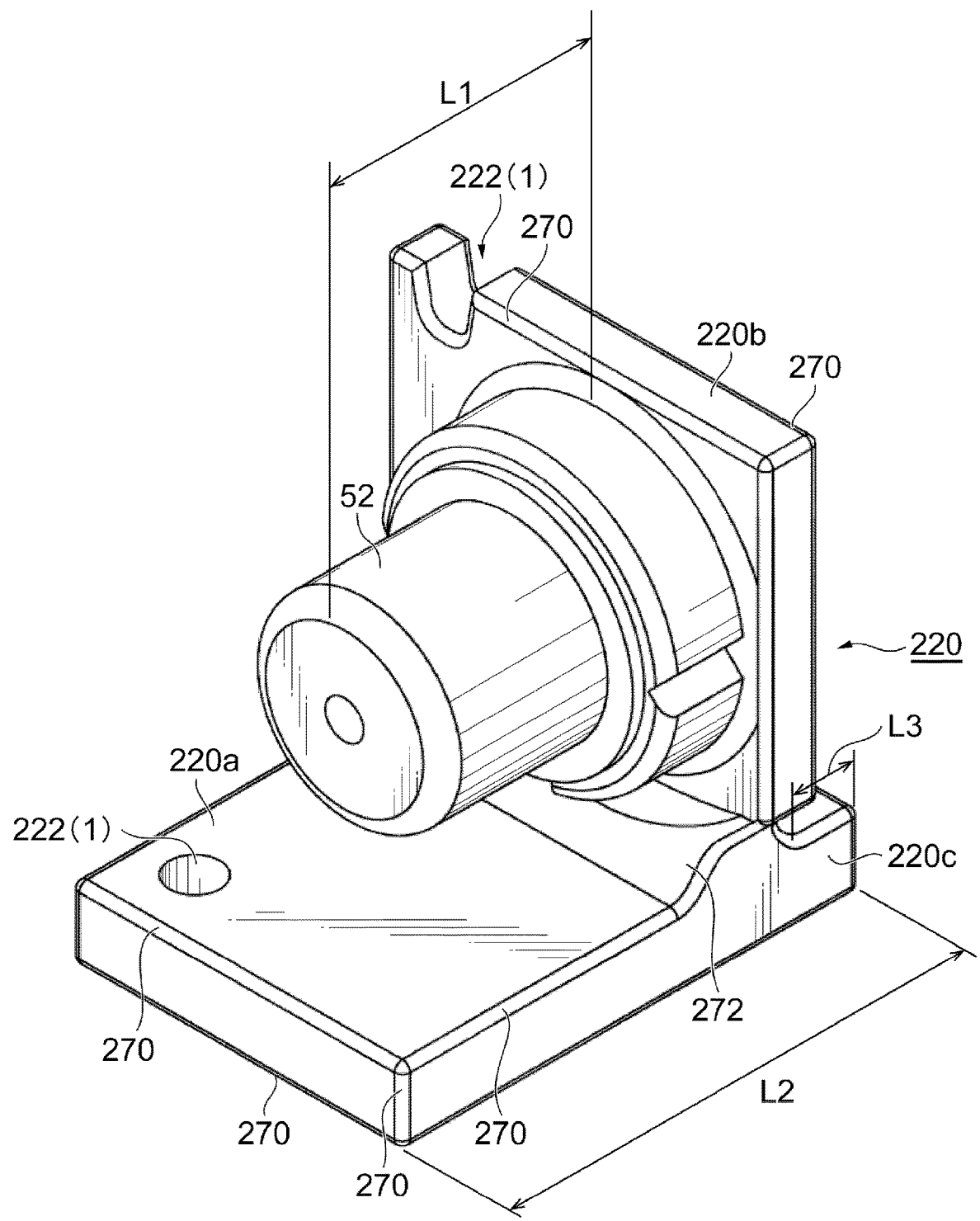
FIG. 13 is a perspective view of a first holder member for light projection as viewed from diagonally above.

FIG. 13 is a perspective view of a first holder member 220 for use in positioning and fixing the light projector 52 as viewed from diagonally above. The first holder member 220 is a molded product including a base 220a and a vertical wall 220b that vertically extends from the base 220a. The light projector 52 is fixed to the vertical wall 220b by adhesion.

Figure 14:
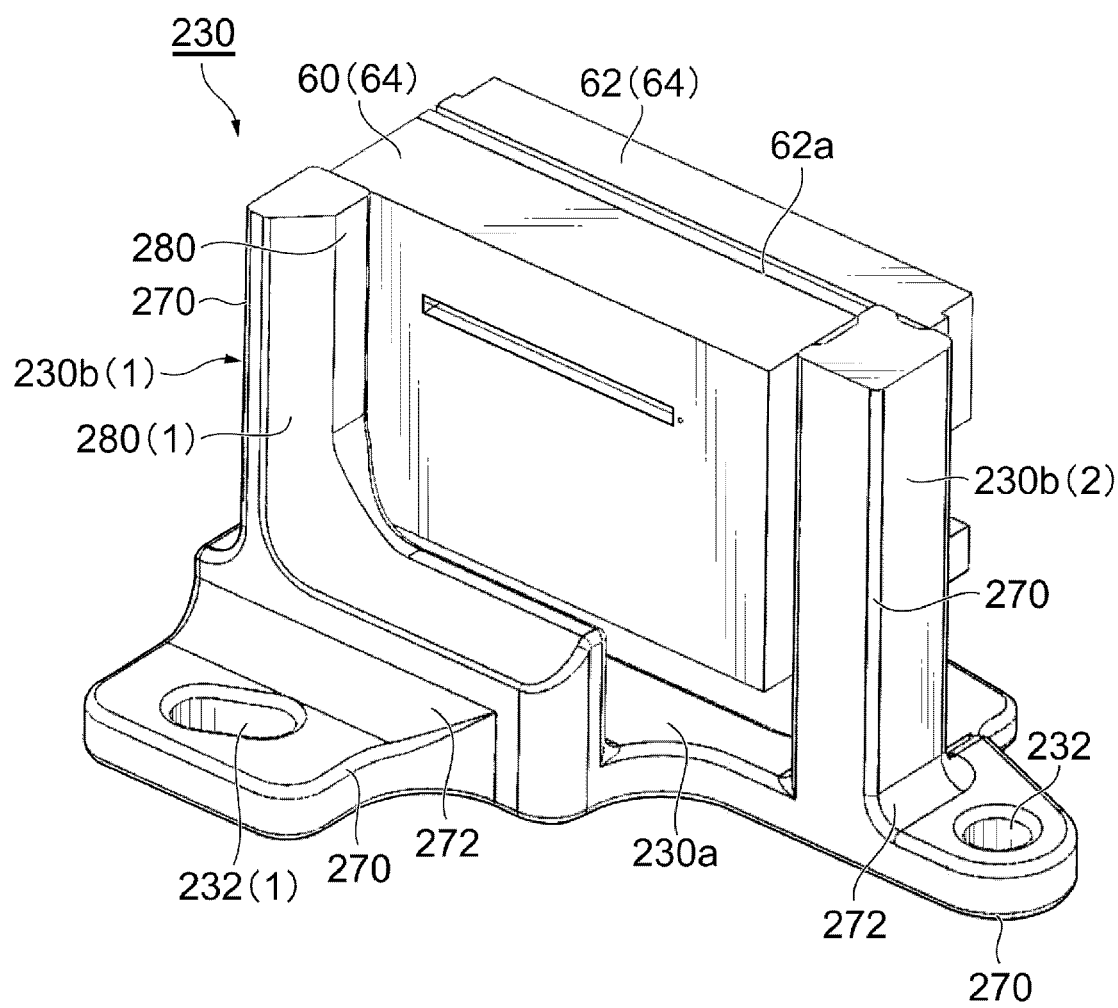
FIG. 14 is a perspective view of a second holder member for light reception as viewed from diagonally above.

FIG. 14 is a perspective view of a second holder member 230 for use in positioning and fixing a structure of the light receiver 64 including the imaging element 60 and the light receiving circuit 62 as viewed from diagonally above. The second holder member 230 is a molded product including a base 230a and two support columns 230b that vertically extend from the base 230a. The imaging element 60 and the light receiving circuit 62 are fixed to the two support columns 230b by adhesion.

The first and second holder members 220, 230 are ceramic molded products made of, for example, alumina. Such a molded product is excellent in electrical insulation, moldability, low thermal expansion coefficient, and thermal conductivity. Therefore, the first and second holder members 220, 230 each made of the ceramic molded product are excellent in shape stability and dimensional stability against fluctuations in atmospheric temperature, and are also excellent in electrical insulation.

As can be seen from FIG. 14, the base 230a of the second holder member 230 includes at least two work holes 232 spaced apart from each other. With reference to FIG. 13, in the first holder member 220, the base 220a has one work hole 222(1), and the vertical wall 220b has the other work hole 222(2) formed on the top surface of the vertical wall 220b, the other work hole 222(2) having a notch shape.

The second holder member 230 has two work holes 222 formed in the base 230a, while the first holder member 230 has one work hole 222(1) formed in the base 230a and the other work hole 222(2) formed in the vertical wall 230b. As can be seen from the above, for each holder member, the two work holes 222 may be arranged on a horizontal surface parallel to the surface of the lid member 206 or on a vertical surface perpendicular to the surface of the lid member 206. In any case, the two work holes 222 provided in each of the holder members 220, 230 should be arranged at corners spaced as far as possible from each other. This makes it possible to increase the positioning accuracy of the holder members 220, 230.

As can be seen from the structure where the first holder member 220 for the light projector 52 and the second holder member 230 for the light receiver 64 are made of separate members, the first holder member 220 to which the light projector 52 is fixed and the second holder member 230 to which the light receiver 64 is fixed can be individually and separately mounted on the lid member 206 and be adjusted in position. The mounting and positioning adjustments are individually performed by a mounting device 250 (FIG. 16) to be described later. With reference to FIG. 13, the two work holes 222 of the first holder member 220 for the light projector 52 are formed at positions adjacent to one side. The side where the two work holes 222 are provided is opposite from the side adjacent to the second holder member 230 for the light receiver 64. This makes it possible to avoid contact between a first mounting device 250 that performs work of mounting the first holder member 220 and a second mounting device 250 that performs work of mounting the second holder member 230.

Figure 15:
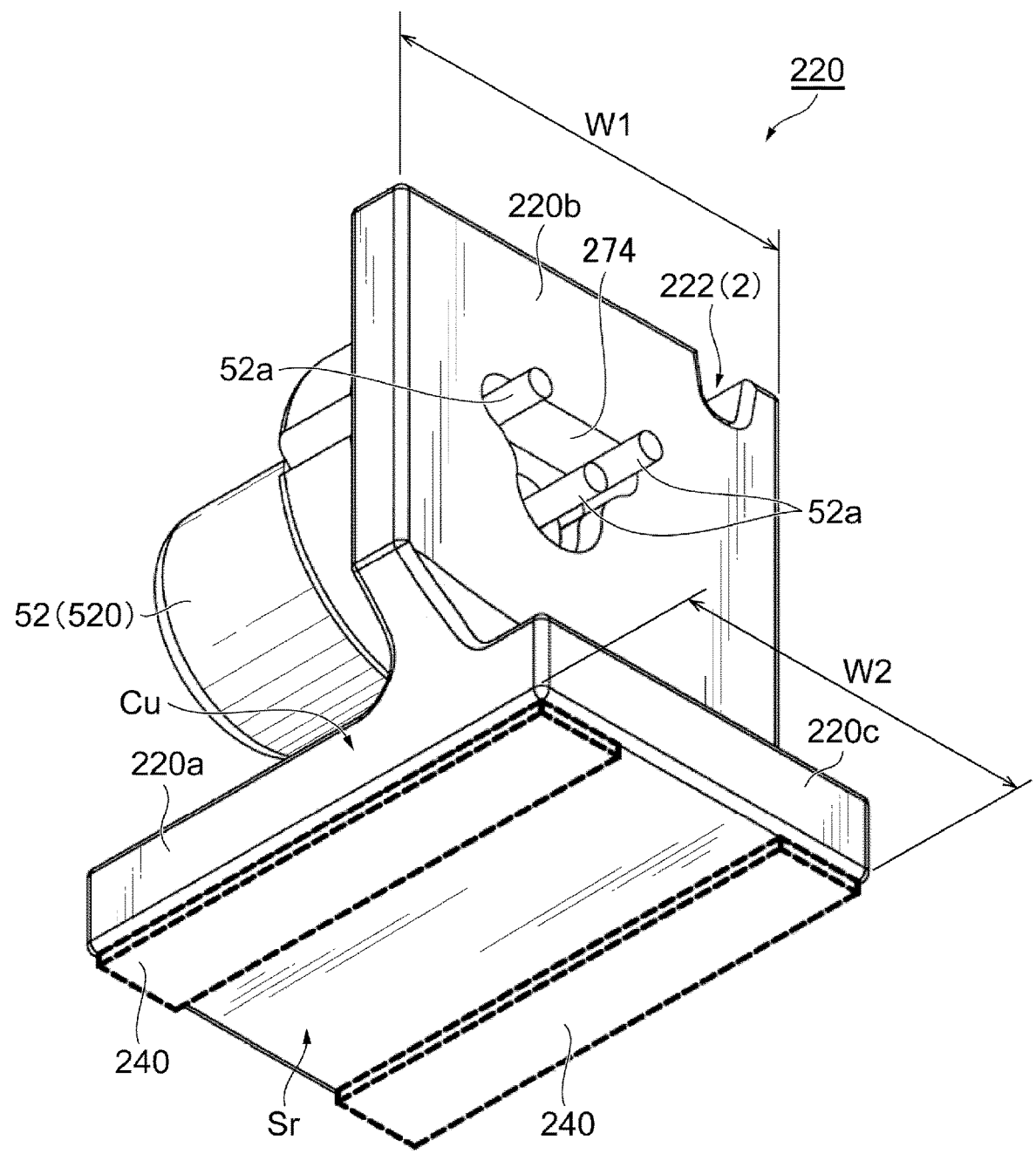
FIG. 15 is a perspective view of the first holder member for light projection as viewed from diagonally below.
Figure 17A:
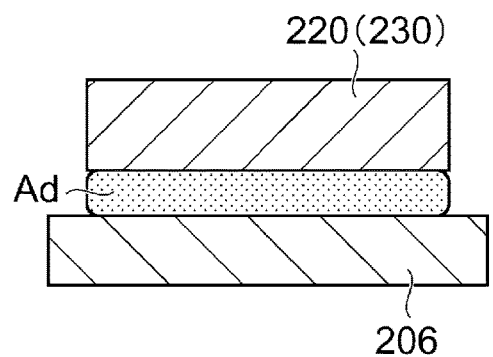
FIG. 17A is a diagram for describing an explanation when no tape is provided on the lower surfaces of the first and second holder members.

The first and second holder members 220, 230 are fixed to the lid member 206 with the adhesive Ad (FIG. 17A). FIG. 15 is a perspective view of the first holder member 220 for light projection as viewed from diagonally below.

When the first holder member 220 is bonded to the lid member 206, as a preparatory process, inner surfaces of at least two band-shaped tapes 240 are bonded, at intervals, to a bottom surface of the base 220a of the first holder member 220. The tapes 240 are preferably excellent in slipperiness. The tapes 240 are not bonded to the lid member 206. The first holder member 220 containing the light projector 52 is positioned on the lid member 206 by the mounting device 250 (FIG. 16), and after the positioning, a space Sr between the two tapes 240 is filled with a liquid adhesive. That is, the space Sr formed by the two tapes 240 is an adhesive-filled region, and the two tapes 240 define the adhesive-filled region Sr (FIG. 15).

Figure 17B:
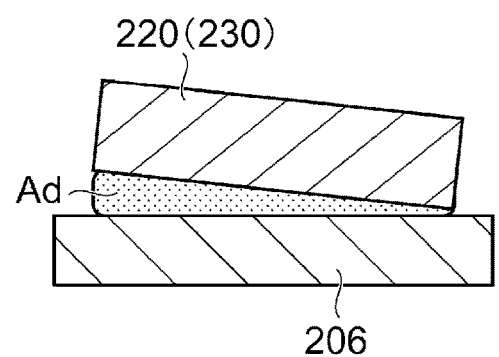
FIG. 17B shows a state where the first and second holder members are bonded to the lid member with an adhesive unevenly applied.
Figure 18:
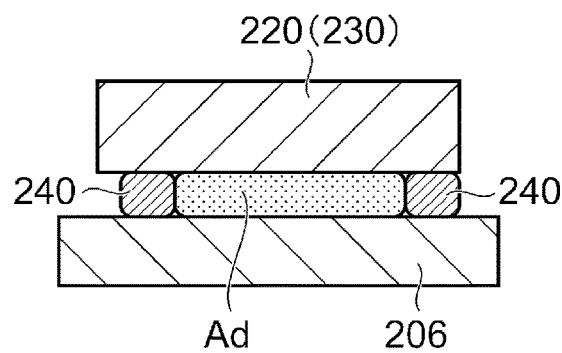
FIG. 18 is a diagram for describing that a silicon tape bonded to the first and second holder members serves as a spacer to allow the first and second holder members to be bonded to the lid member in a fixed position.

The two tapes 240 serve as a spacer, and the thickness of the tapes 240 can determine the thickness of the adhesive Ad with which the adhesive-filled region Sr is filled. FIGS. 17A and 17B are a diagram for describing an explanation when the tapes 240 are not provided. Ideally, the adhesive Ad is uniformly present between the first and second holder members 220, 230 and the lid member 206, thereby allowing the first and second holder members 220, 230 to be fixed to the lid member 206 in the proper position (FIG. 17A). However, when the adhesive Ad is non-uniform, the first and second holder members 220, 230 are tilted (FIG. 17B). This tilt is an uncertain factor. FIG. 18 is a diagram for describing a case where the tapes 240 are provided. The two tapes 240 located between the first and second holder members 220, 230 and the lid member 206 serve as a spacer and can uniquely position the first and second holder members 220, 230 with respect to the lid member 206.

Since the two tapes 240 serve as a spacer as described above, the adhesive-filled region Sr should occupy the maximum area on the bottom surfaces of the first and second holder members 220, 230. This makes it possible to ensure the unique installation positions of the first and second holder members 220, 230 with respect to the lid member 20 and the fixing of the first and second holder members 220, 230. For this purpose, it is preferable that the two tapes 240 be arranged on opposite side edges of the bottom surfaces of the first and second holder members 220, 230.

According to a description given with reference to FIG. 15 with the first holder member 220 as an example, left and right tapes 240 extending continuously along both the side edges of the base 220a having a rectangular shape in plan view are arranged. This makes it possible to form the adhesive-filled region Sr as large as possible. As described above, one work hole 222 (FIGS. 13 and 16) is formed in the base 220a of the first holder member 220. It is preferable that the work hole 222 be covered by the tape 240. This makes it possible to prevent the liquid adhesive with which the adhesive-filled region Sr is filled from entering the work hole 222. This in turn makes it possible to determine the amount of the adhesive with which the adhesive-filled region Sr is filled as a predetermined amount, and the adhesive-filled region Sr can be filled with the predetermined amount of the adhesive Ad. Then, the thickness of the tapes 240 can determine the uniform thickness of the adhesive Ad. This makes it possible to prevent the first holder member 220 from changing in position after being fixed to the lid member 206.

Figure 16:
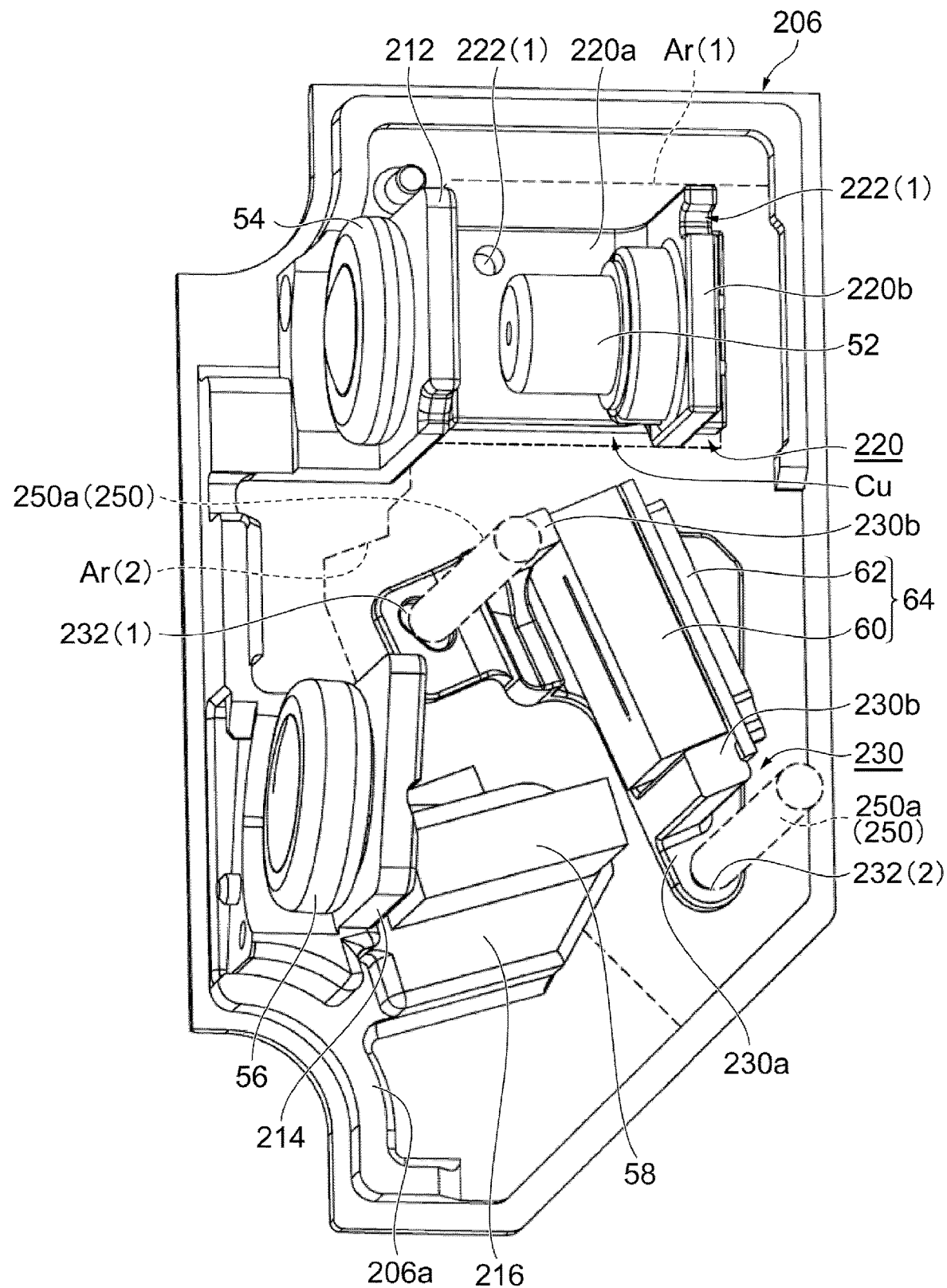
FIG. 16 is a diagram for describing that the first holder member and the second holder member are positioned by using fingers of a mounting device, and the first and second holder members thus positioned and a lid member are held until an adhesive for use in bonding the first and second holder members to the lid member hardens.

FIG. 16 is a plan view showing a state where the first holder member 220 and the second holder member 230 are being mounted on the lid member 206. Attention given to the second holder member 230 that holds the light receiver 64 shows that the base 230a has an approximate crescent shape that results from further cutting out a side of a triangle in plan view that is adjacent to the mirror 58 and largely cut out. It is further shown that the first and second work holes 232(1), 232(2) are arranged at the opposite corners adjacent to the mirror side 58.

Note that it is shown that the first work hole 232(1) is a slotted hole, and a major axis of the first work hole 232(1) that is the slotted hole extends toward the second work hole 232(2). As a modification, the second work hole 232(2) may be a slotted hole. Forming one of the first and second work holes 232(1) and 232(2) into a slotted hole makes it possible to absorb manufacturing tolerances when the second holder member 230 is handled by the mounting device 250 (FIG. 20) to be described later.

As described above, no illustration has been given of the base 230a having an approximate crescent shape in plan view, but the two tapes 240 are arranged to cover the first and second work holes 232(1), 232(2). Specifically, the tape 240 for the first work hole 232(1) extends over the entire area of the side opposite from the second work hole 232(2). On the other hand, the tape 240 for the second work hole 232(2) is disposed on the portion corresponding to the second work hole 232(2).

With reference to FIG. 16, the mounting device 250 includes two fingers 250a, the two fingers 250a are inserted into, for example, the work holes 222 of the second holder member 230 for light reception to position the second holder member 230 at a predetermined location. After this positioning, the space Sr (FIG. 15) between the two tapes 240 is filled with the adhesive Ad, and the first and second holder members are held by the fingers 250a until the adhesive Ad hardens. The same applies to the first holder member 220 for light projection. On the lid member 206, the optical components are first mounted, and then the mounting device 250 performs the work of mounting the first and second holder members 220, 230.

Before this mounting work, the light projector 52 is bonded to the first holder member 220, and the light receiver 64 is bonded to the second holder member 230.

In the process of individually positioning the first and second holder members 220, 230 with the mounting device 24, the tapes 240 excellent in slipperiness allow the first and second holder members 220, 230 to be smoothly positioned by slight movement of the fingers 250a. The tapes 240 serving as a spacer as described above can determine an appropriate amount of the adhesive Ad with which the adhesive-filled region Sr is filled. The green LD 520 requires a higher voltage than a voltage required for a red LD, in other words, the green LD 520 generates heat more than heat generated by the red LD. Since the first and second holder members 220, 230 are ceramic molded products, the holder members 220, 230 are less susceptible to thermal deformation due to characteristics of the ceramic material.

<Mounting Light Projector 52 and Light Receiver 62 on Lid Member 206>

Figure 19:
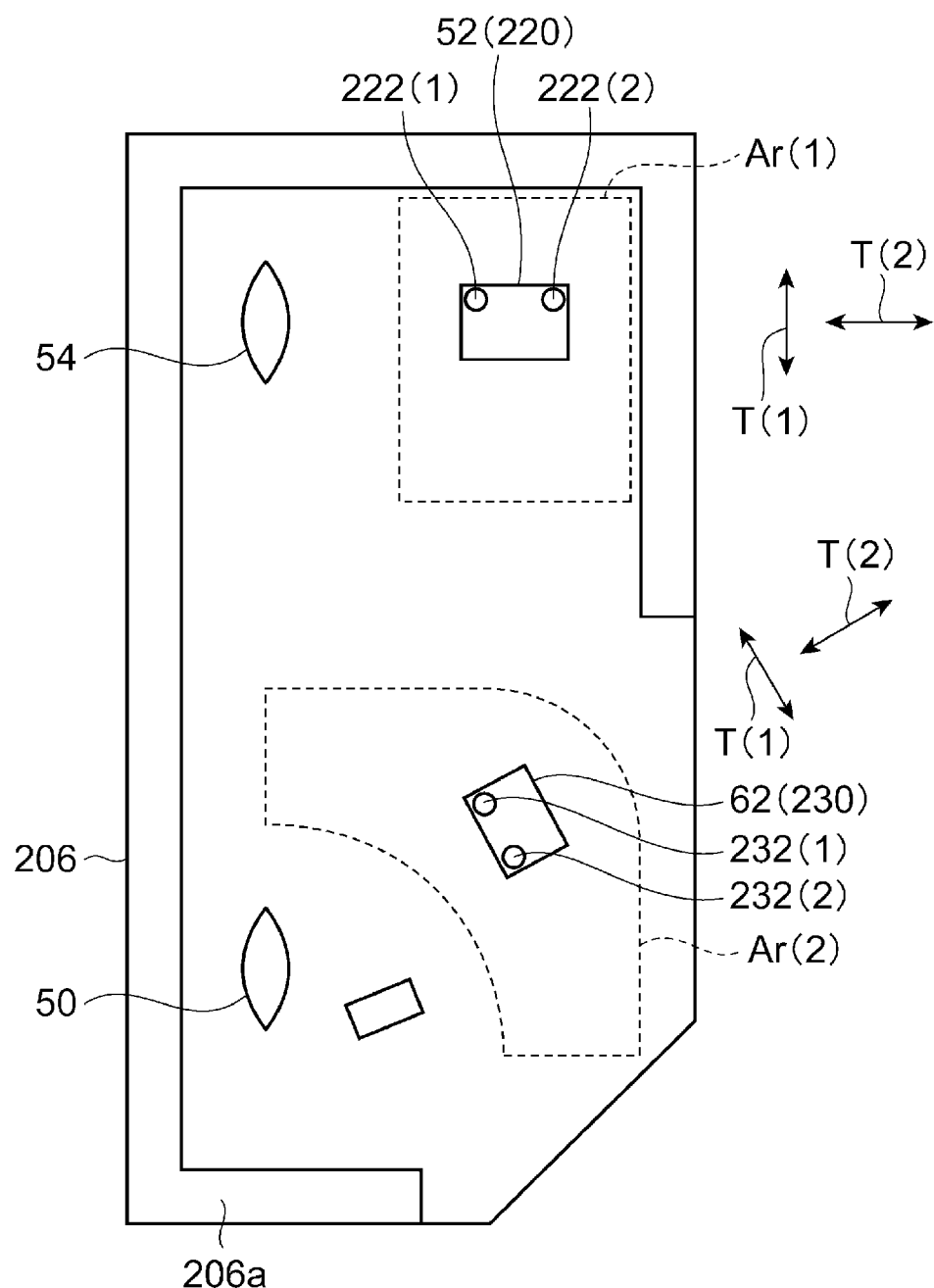
FIG. 19 is a diagram for describing an adjustable range when the first and second holder members are installed on the lid member.

In FIG. 19, an arrow T(1) denotes a direction of optical axis adjustment work, and an arrow T(2) denotes a direction of focal position adjustment work. The arrangement direction of the two work holes 222 of the first holder member 220 and the two work holes 232 of the second holder member 230 should coincide with the direction T(1) of optical axis adjustment work. This makes it easier to create an adjustment work program for the mounting device 24. The light projector 52 and the light receiver 62 are positioned so as to satisfy Scheimpflug principle.

The mounting positions of the light projector 52 and the light receiver 62 change in a manner that depends on a manufacturing error of each component including the first and second holder members 220, 230. A maximum range that changes in a manner that depends on the manufacturing tolerance of each component is predetermined as the mounting positions of the first and second holder members 220, 230, and adjustable ranges of Ar(1), Ar(2) of the first and second holder members 220, 230 corresponding to this maximum range, that is, clearance, are defined as a flat surface, and the first and second holder members 220, 230 can be bonded.

With reference to FIGS. 16 and 19, a reference numeral 206a denotes a raised portion of the lid member 206. The raised portion 206a extends continuously along a peripheral edge of the lid member 206. Rigidity of the lid member 206 can be increased by the raised portion 206a. From this point of view, it is desirable that the raised portion 206a be formed all over the outer peripheral edge of the lid member 206, but the raised portion 206a is not provided near the second adjustable range Ar(2), that is, a region where the second holder member 230 that holds the light receiver 64 is mounted.

The head 2 is designed to be downsized to the maximum extent possible, and the light projector 52 and the light receiver 64 are arranged close to each other under the intention. Accordingly, the first and second adjustable ranges Ar(1), Ar(2) are adjacent to each other. Note that FIG. 19 is a diagram for describing the presence of the first and second adjustable ranges Ar(1), Ar(2) by schematically showing the first and second adjustable ranges Ar(1), Ar(2), and in fact, as can be seen from FIG. 12, the first and second holder members 220, 230 are arranged close to each other. Therefore, the first and second adjustable ranges Ar(1), Ar(2) are adjacent to each other (FIG. 16). A limit is put on the size of the lid member 206, and in order to give a higher priority to providing the first and second adjustable ranges Ar(1), Ar(2), no raised portion 206a is provided on a portion that lies within the second adjustable range Ar(2).

As a modification of the first and second holder members 220, 230, the first and second holder members 220, 230 may be resin molded products containing a ceramic material having electrical insulation.

Figure 20:
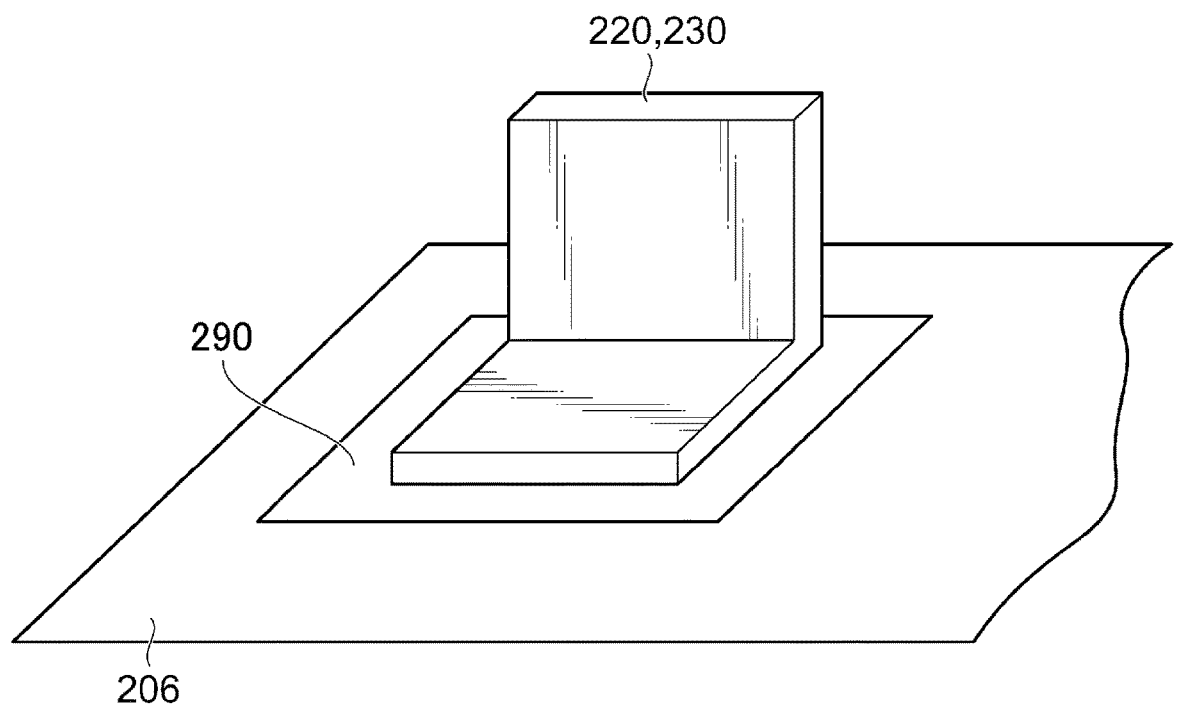
FIG. 20 is a diagram for describing a modification where, for example, the first and second holder members made of a metal material are bonded to the lid member with a ceramic plate interposed between the first and second holder members and the lid member.

As another modification of the first and second holder members 220, 230, as shown in FIG. 20, the first and second holder members 220, 230 may be bonded to the lid member 206 with a sheet or plate 290 having electrical insulation interposed between the first and second holder members 220, 230 and the lid member 206. The sheet or plate 290 is preferably excellent in heat conductivity. Typical examples of the plate 290 having heat conductivity and electrical insulation include a thin ceramic plate. Instead of the sheet or plate 290, the adhesion surfaces of the first and second holder members 220, 230 and/or the corresponding portions of the lid member 206 may be coated with a material having electrical insulation. It is also preferable that this coating material be excellent in not only electrical insulation but also heat conductivity. According to another modification, the first and second holder members 220, 230 are not limited to ceramic molded products, and, for example, metal molded products can be used.

<Downsizing of Head 2>

The operation part 402 and the display (OELD) 12 are removed from the head 2, and the operation part 402 and the display 12 are preferably installed in the body 4 to which the relay cable 6 extending from the head 2 is integrally connected, thereby allowing the head 2 to be downsized while creating substantially the same usage state as in which the operation part 402 and the display 12 are provided in the head 2. Then, only the light projecting and receiving surface 2a of the head 2 having a somewhat flat and approximate cuboid shape is used as the user interface surface, both the side surfaces 2f (FIG. 11) are flat surfaces, and the mounting through-holes Th passing through in a direction orthogonal to the optical axis are formed such that both the side surfaces 2f are used as mounting surfaces. Then, installing the operation indicator lamp 70 on the light projecting and receiving surface 2a allows the other five surfaces, that is, one end surface (top surface) 2b and the other end surface (bottom surface) 2c in the longitudinal direction, both the side surfaces 2f (FIG. 11), and the back surface 2d to be formed into flat surfaces that do not serve as the user interface, and the head 2 can be installed using not only both the side surfaces 2f but also any one of the top surface 2b, the bottom surface 2c, or the back surface 2d.

With reference to FIG. 12, the light projector 52 is disposed at a position as close as possible to the end 2b of the head main housing 204. The head main housing 204 is made of metal. A reference numeral 260 denotes a light projecting circuit board. The light projecting circuit board 260 is positioned adjacent to the head main housing 204 and is surrounded by an insulating member 262. The light projecting circuit board 260 and the head main housing 204 are electrically insulated by the insulating member 262.

The front operation indicator lamp 70 is formed into a unit, and this indicator lamp unit includes an LED drive circuit board 266. Further, a light diffusing member 268 serving as a part of the front operation indicator lamp 70 is attached later by the metal holding member 40. The light diffusing member 268 has a space 268a, and light attenuation is adjusted by the space 268a.

In the light receiving lens 56, an area through which the detection light passes is restricted by a slit (not shown). This restricted area is denoted by a reference numeral 56a. As described above, the mirror 58 is interposed between the light receiving lens 56 and the light receiver 64. Interposing the mirror 58 allows the light receiver 64 to be disposed near the light projector 52. Further, restricting the area of the light receiving lens 56 through which the detection light passes allows the mirror 58 to be disposed near the light receiving lens 56.

In FIG. 12, a reference numeral 214a denotes a recess having a shape cut out from the light receiving lens holder 214. Since the mirror 58 is disposed near the light receiving lens 56, the recess 214a is formed to receive a portion of the light receiving lens holder 214, that is, a portion that comes into contact with the mirror holder 216. This allows the mirror 58 to be disposed at a position that overlaps the light receiving lens holder and is near the light receiving lens 56.

With reference to FIG. 14, a reference numeral 280 denotes a side surface of the first support column 230b(1) facing the mirror 58. A portion 280(1) closer to the mirror 58 that serves as most of the side surface 280 is formed into an inclined surface. The side surface 280 of the first support column 230b(1) receives light reflected off the mirror 58, and light reflected off the side surface 280 may become stray light and impinge on the light receiver 64. Forming most of the side surface 280 into the inclined surface 280(1) makes it possible to prevent some of the detection light from the mirror 58 reflected off the side surface 280 from becoming stray light and impinging on the light receiver 64.

<Structure of First and Second Holder Members 220, 230 for Downsizing>

With reference to FIGS. 13 and 14, the first holder member 220 that holds the light projector 2 and the second holder member 230 that holds the light receiver 64 are each formed with all corners 270 rounded. Forming the corners 270 into a round shape makes it possible to prevent the first and second holder members 220, 230 each made of ceramic from being chipped during work such as installation of the first and second holder members 220, 230 on the lid member 206.

The bases 220a, 230a of the first holder member 220 that hold the light projector 2 and the second holder member 230 have raised portions 272 at important positions. The raised portion 272 can increase rigidity of the first holder member 220 and the second holder member 230. Note that, with reference to FIG. 12, through the vertical wall 220b of the first holder member 220, an opening 274 through which three terminals 52a of the light projector 52 pass is formed. The opening 274 may be formed for each of the three terminals 52a. This makes an area of the opening of the holder smaller and in turn makes it possible to further increase the rigidity.

With reference to FIG. 10, the first holder member 220 is designed to make a length dimension L2 of the base 220a larger than a length dimension L1 of the light projector 2 (L1<L2), and the base 220a has an extension 220c with a length dimension L3 that extends rearward from the vertical wall 220b. Designing the length dimension L2 of the base 220a to be larger than the length dimension of the light projector 2 makes it possible to increase stability and rigidity of the first holder member 220, and making a creepage distance between the lid member 206 made of metal and the light projector 2 longer makes it possible to increase insulation.

With reference to FIG. 15, the first holder member 220 that holds the light projector 52 is designed to make a width W2 of the base 220a smaller than a width W1 of the vertical wall 220b. As can be seen most clearly from FIG. 16, the base 220a of the first holder member 220 has a shape that results from cutting out a region Cu, adjacent to the second holder member 230, of the base 220a, and this cutout region Cu reduces the width W2 of the base 220a. This allows the adjustable range Ar(2) for the second holder member 230 to be expanded toward the first holder member 220. This means that the space between the first holder member 220 and the second holder member 230 can be reduced. That is, since the separation distance between the light projector 52 and the light receiver 62 can be designed to be small, the head 2 can be downsized.

With reference to FIG. 14, a reference numeral 62a denotes a flexible substrate. The light receiver 64 has a box shape. The two support columns 230b of the second holder member 230 that holds the light receiver 64 are arranged on both sides of the light receiver 64 having a box shape. Of the two columns, the first column 230b(1) adjacent to the first holder member 220 is positioned adjacent to the front side of the light receiver 64 having a box shape. On the other hand, the second support column 230b(2) adjacent to the other side of the light receiver 64 is positioned adjacent to a side surface of the light receiver 64 having a box shape. Positioning the first support column 230b(1) adjacent to the front side of the light receiver 64 makes it possible to reduce the space between the first holder member 220 and the second holder member 230, and the separation distance between the light projector 52 and the light receiver 62 can be designed to be smaller, thereby allowing the head 2 to be downsized. The flexible substrate may be a multilayer flexible substrate. The use of the multilayer flexible substrate allows enhanced functionality to be implemented.

As described above, the mounting device 250 mounts and positions the first and second holder members 220, 230 on the lid member 206 with the two fingers 250a. As can be seen most clearly from FIG. 16, the two fingers 250a are inserted into the work holes 232. With reference to FIG. 14, one of the two work holes 232, the work hole 232(1), is preferably formed into a slotted hole.

This makes it possible to absorb manufacturing tolerances of the first and second holder members 220, 230. Note that, according to a description given with the second holder member 230 as an example, it is preferable that the two work holes 232 be spaced as far as possible from each other in order to increase the assembly accuracy. In the second holder member 230 shown in FIG. 14, the two work holes 232 are formed in the base 230a, but one work hole 232 may be formed in, for example, the second support column 230b(2).

Although the preferred embodiment and modifications of the present invention have been described above, the present invention is also applicable to a separate displacement sensor in which the body 4 is fixed to a predetermined position, for example, a DIN rail.

What is claimed is:

1. A displacement sensor comprising:
   a light projecting element that projects light;
   a metal housing including a transmission window that transmits light;
   a first holder bonded to a first flat surface of an optical base, that holds the light projecting element, the optical base being a part of the metal housing, the first flat surface corresponding to an adjustable range in which the first holder is positioned;
   a light projecting lens fixed to the optical base, condenses the light projected from the light projecting element for forming a light projected spot, and causes the light to impinge on a detection region through the transmission window;
   a light receiving lens fixed to the optical base and condenses light from the detection region to form an image of the light projected spot in the detection region;
   an imaging element that captures the image of the light projected spot in the detection region formed by the light receiving lens and generates a light receiving signal in accordance with intensity of received light;
   a second holder bonded to a second surface of the optical base that holds the imaging element, the second flat surface corresponding to an adjustable range in which the second holder is positioned; and
   a measuring part that identifies a position of the light projected spot in the imaging element on the basis of the light receiving signal from the imaging element and measures displacement of a to-be-detected object on the basis of the position of the light projected spot identified, wherein
   the light projecting element and the imaging element are insulated from the optical base by the first holder and the second holder each made of a ceramic material, and
   the first holder and the second holder are individually bonded to the optical base.

2. The displacement sensor according to claim 1, wherein the first holder and the second holder are each made of a ceramic molded product, and the light projecting element and the imaging element are electrically insulated from the optical base by the ceramic molded product.

3. The displacement sensor according to claim 1, wherein the optical base is a metal molded product,
a first lens holder holding the light projecting lens and a second lens holder holding the light receiving lens are molded integrally with the optical base,
the light projecting lens is fixed to the first lens holder with an adhesive, and
the light receiving lens is fixed to the second lens holder with an adhesive.

4. The displacement sensor according to claim 1, wherein the optical base modularized by incorporating the optical component is welded to a main housing of the metal housing.

5. The displacement sensor according to claim 4, wherein the main housing serves as a main housing having a side opening, and
the optical base serves as a lid member that covers the side opening of the main housing.

6. The displacement sensor according to claim 1, wherein the first holder has at least two work holes.

7. The displacement sensor according to claim 6, wherein the second holder has at least two work holes.

8. The displacement sensor according to claim 7, wherein
a first plurality of tapes are bonded to bottom surfaces of the first holder, and the first plurality of tapes define an adhesive-filled region where the first holder is bonded to the optical base,
the first plurality of tapes form a spacer between the first holder and the optical base,
a second plurality of tapes are bonded to bottom surfaces of the second holder, and the second plurality of tapes define an adhesive-filled region where the second holder is bonded to the optical base,
the second plurality of tapes form a spacer between the second holder and the optical base.

9. The displacement sensor according to claim 1, wherein the second holder has at least two work holes.

10. The displacement sensor according to claim 1, wherein
a lens barrel is provided between the light projecting element and the light projecting lens, and
the lens barrel is made of a flexible member.

11. The displacement sensor according to claim 1, wherein
a first plurality of tapes are bonded to bottom surfaces of the first holder, and the first plurality of tapes define an adhesive-filled region where the first holder is bonded to the optical base, and
the first plurality of tapes form a spacer between the first holder and the optical base.

12. The displacement sensor according to claim 11, wherein
a second plurality of tapes are bonded to bottom surfaces of the second holder, and the second plurality of tapes define an adhesive-filled region where the second holder is bonded to the optical base, and
the second plurality of tapes form a spacer between the second holder and the optical base.

13. The displacement sensor according to claim 1, wherein
a second plurality of tapes are bonded to bottom surfaces of the second holder, and the second plurality of tapes define an adhesive-filled region where the second holder is bonded to the optical base, and
the second plurality of tapes form a spacer between the second holder and the optical base.

14. The displacement sensor according to claim 1, wherein
a mirror is provided between the light receiving lens and the imaging element,
a mirror holder that holds the mirror is molded integrally with the optical base, and
the mirror is bonded to the mirror holder.

15. The displacement sensor according to claim 1, wherein an operation indicator lamp is disposed between the light projecting lens and the light receiving lens.

16. The displacement sensor according to claim 1, wherein the shorter a distance, the larger a pixel width of the imaging element, and the longer the distance, the smaller the pixel width of the imaging element.

17. The displacement sensor according to claim 1, wherein the light projecting lens is made of a collimator lens or a combination of a collimator lens and a cylindrical lens.

18. The displacement sensor according to claim 1, wherein the first holder is a ceramic molded product.

19. The displacement sensor according to claim 18, wherein the second holder is a ceramic molded product.

20. The displacement sensor according to claim 1, wherein the second holder is a ceramic molded product.

* * * * *